(12) United States Patent
Uht et al.

(10) Patent No.: US 7,991,980 B2
(45) Date of Patent: Aug. 2, 2011

(54) CONCURRENT EXECUTION OF INSTRUCTIONS IN A PROCESSING SYSTEM

(75) Inventors: Augustus K. Uht, Cumberland, RI (US); David Morano, Malden, MA (US); David Kaeli, Medway, MA (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 177 days.

(21) Appl. No.: 12/254,684

(22) Filed: Oct. 20, 2008

(65) Prior Publication Data
US 2009/0043994 A1    Feb. 12, 2009

Related U.S. Application Data

(62) Division of application No. 11/248,374, filed on Oct. 11, 2005, now abandoned, which is a division of application No. 09/828,600, filed on Apr. 6, 2001, now Pat. No. 6,976,150.

(60) Provisional application No. 60/194,931, filed on Apr. 6, 2000.

(51) Int. Cl.
*G06F 9/30* (2006.01)

(52) U.S. Cl. ........................................ 712/217
(58) Field of Classification Search .................. 712/217, 712/216
See application file for complete search history.

(56) References Cited

U.S. PATENT DOCUMENTS

| 4,847,755 | A | 7/1989 | Morrison et al. |
| 6,578,138 | B1 | 6/2003 | Kyker et al. |
| 6,643,767 | B1 * | 11/2003 | Sato ............................... 712/219 |
| 6,976,150 | B1 | 12/2005 | Uht et al. |

OTHER PUBLICATIONS

Gabbay, Freddy, Speculative Execution based on Value Prediction, research report, Technion—Israel Institute of Technology, Electrical Engineering Department, Nov. 1996.*

Patterson et al., A Case for Intelligent RAM, IEEE Micro, pp. 34-44, 1997.*

Augustus K Uht, "Overview of the Levo High-ILP Computer", University of Rhode Island, Dept. of Electrical and Computer Engineering, Technical Report No. 0797-0001, pp. 1-19, 1997.

Agerwala et al., "Data Flow Systems-Special Issue," IEEE Computer, vol. 15, No. 2, pp. 10-13, 1982.

Aiken et al., "Perfect Pipelining: A New Loop Parallelization Technique," in Proceedings of the 1988 European Symposium on Programming, 1988, 15 pages total.

Austin et al., "Dynamic Dependency Analysis of Ordinary Programs," in Proceedings of the 19th Annual International Symposium on Computer Architecture, Gold Coast, Australia, pp. 342-351, IEEE and ACM, May 1992.

(Continued)

*Primary Examiner* — Richard Ellis
(74) *Attorney, Agent, or Firm* — Connolly Bove Lodge & Hutz LLP

(57) ABSTRACT

A scalable processing system includes a memory device having a plurality of executable program instructions, wherein each of the executable program instructions includes a timetag data field indicative of the nominal sequential order of the associated executable program instructions. The system also includes a plurality of processing elements, which are configured and arranged to receive executable program instructions from the memory device, wherein each of the processing elements executes executable instructions having the highest priority as indicated by the state of the timetag data field.

20 Claims, 7 Drawing Sheets

OTHER PUBLICATIONS

Banerjee et al., "Fast Execution of Loops With IF Statements," IEEE Transactions on Computers, vol. C-22, pp. 1030-1033, Nov. 1984.

Beck et al., "The cydra 5 minisupercomputer: Architecture and implementation," Journal of Supercomputing, vol. 7, pp. 143-180, 1993.

Brekelbaum et al., "Hiefarchical Scheduling Windows," Proceedings of the 35th Annual International Symposium on Microarchitecture. Istanbul, Turkey: IEEE, ACM, Nov. 2002.

Burger et al, "Billion-Transistor Architectures," IEEE Computer, vol. 30, No. 9, Sep. 1997.

Burger et al., "THe SimpleScalar Tool Set, Version 2, " URL:http://www.simplescalar.com/docs/usersguide v2.pdf. created 1997, accessed: Jun. 14, 2002.

Calder et al., "Value profiling," in Proceedings of the 30th IEEE Symposium on Microarchitecture, Dec. 1997.

Chen, "Supporting Highly Speculative Execution via Adaptive Branch Trees," in Proceedings of the 4th Annual International Symposium on High Peiformance Computer Architecture: IEEE, Jan. 1998, pp. 185-194.

Cleary et al., "Scaling the reorder buffer to 10,000 instructions," IEEE TCCA News, pp. 16-20, Jun. 2000.

Cleary et al., "The Architecture or an Optimistic CPU: The Warp Engine," in Proceedings of the HICSS95, pp. 163-172, University of Hawaii, Jan. 1995.

Colwell et al., "A VLIW Architecture for a Trace Scheduling Compiler," IEEE Transactions on Computers, vol. C-37, pp. 967-979, Aug. 1988.

Colwell et al., "A VLIW Architecture for a Trace Scheduling Compiler, " in Proceedings of the Second International Conference Architectural Support for Programming Languages and Operating Systems (ASP LOS II): ACM and IEEE, Sep. 1987, pp. 180-192.

Cragon, Branch Strategy Taxonomy and Performance Models, Los Alamito, California: IEEE Computer Society Press, 1992, 9 pages total.

Cyton, "Doacross: Beyond Vectorization for Multiprocessors (Extended Abstract)," In Proceedings of the 1986 International Conference on Parallel Processing, pp. 836-844, Pennsylvania State University and the IEEE Computer Society, Aug. 1988.

Dutta et al., "Control Flow Prediction with Tree-Like Subgraphs for Superscalar Processor,"in Proceedings of the 28th International Symposium on Micmarchitecture(MICRO-28), pp. 258-263, IEEE and ACM, Nov. Dec. 1995.

Ebcioglu et al., "Daisy: Dynamic Compilation for 100% Architectural Compatibility," IBM Research Report RC 20538, IBM Research Division, Aug. 5, 1996, 82 pages total.

Ebcioglu, "A Compilation Technique for Software Pipelining of Loops with Conditional Jumps," in Proceedings of the Twentieth Annual Workshop on Microprogramming (MICRO20), pp. 69-79, Association of Computing Machinery, Dec. 1987.

Ellis, Bulldog: A Compiler for VLIW Architectures. PhD thesis, Yale University, New Haven, CT, 292 total pages, 1985.

Foster et al., "Percolation of Code to Enhance Parallel Dispatching and Execution," IEEE Transactions on Computers, vol. C-21, pp. 1411-1415, Dec. 1972.

Franklin et al., "Register Traffic Analysis for Streamlining Inter-Operation Communication in Fine-Grain Parallel Processors," in Proceedings of the Twenty-Fifth International Symposium on Microarchitecture(MICRO-25): IEEE and ACM, Dec. 1992, pp. 236-245.

Franklin et al., "The Expandable Split Window Paradigm for Exploiting Fine-Grain Parallelism," In Proceedings of the 19th International Syposium on Computer Architecture , pp. 58-67, ACM, May 1992.

Ginosar et al., "Adaptive Synchronization," in Proceedings of the 1998 International Conference on Computer Design, 2 pages total, 1998.

Glass, "Crusoe: Transmeta comes out of the closet," in http://www.linuxplanet.com/linuxplanet/reports/1441/1/, 6 pages total, 2000.

Gonzalez et al., "Limits on Instruction-Level Parallelism with Data Speculation," Department Architectura de Computadores, Universlitat Polytechnica Catalan, Barcelona, Spain, Technical Report UPC-DAC-1997-34, 14 pages total, 1997.

Gopal et al., "Speculative Versioning Cache,"University of Wisconsin, Madison, Technical Report TR-1334, 11 pages total, Jul. 1997.

Gostelow, "The u-interpreter," IEEE Computer, vol. 15, pp. 42-49, Feb. 1982.

Gurd et al., "The manchester prototype dataflow computer," Communications of the ACM, vol. 28, pp. 34-52, Jan. 1985.

Henning, "Spec Cpu2000: Measuring CPU Performance in the New Millenium," IEEE Computer, vol. 33, No. 7, pp. 28-35, Jul. 2000.

Henry et al., "Circuits for Wide-Window Superscalar Processors," in Proceedings of the 27th Annual International Symposium on Computer Architecture. Vancouver, BC, Canada: IEEE and ACM, Jun. 10-14, 2000, pp. 236-247.

Henry et al., "The Ultrascalar Processor: An Asymptotically Scalable Superscalar Microarchitecture," in HIPC '98, Dec. 1998, URL: http://ee.yake.edu/papersIHPC98-abstract.ps.gz, 18 pages total.

Huck et al., "Introducing the 1a-64 architecture,"IEEE Micro, pp. 12-23, Sep. 2000.

Jefferson, "Virtual Time," Transactions on Programming Languages and Systems, vol. 7, No. 3, pp. 404-425, Jul. 1985.

Jouppi et al., "Available instruction-level parallelism for superscalar and superpipelined machines," in Proceedings of the International Conference on Architectural Support for Programming Languages and Operating Systems, pp. 272-282, Apr. 1999.

Karkhanis et al.,;"A Day in the Life of a Data Cache miss," in Proceedings of the 2nd Annual Workshop on Memory Pelformance issues (WMPI), at the 29th International Symposium on Computer Architecture(ISCA 2000). Anchorage, Alaska, May 2002.

Khalafi et al., "Realizing High IPC Through a Scalable Memory-Latency Tolerant Multipath Microarchitecture," Department of Electrical and Computer Engineering, University of Rhode Island, Kingston, RI 02881-0805, Technical Report 032002-0101, Apr. 2, 2002, URL:http://www.ele.url.edu/-uht/papers/Levo4TR032002-01 OI.I)df., 11 pages total.

Kim et al., "An Instruction Set Architecture and Microarchitecture for Instruction Level Distributed Processing," In Proceedings of the 29th Annual International Symposium on Computer Architecture. Anchorage, Alaska, USA: ACM, May 25-29, 2002.

Klauser et al., "Dynamic Hammock Predication for Non-predicated instruction Set Architectures," in Intl. Conf on Parallel Architectures and Compilation Techniques (PACT). Paris, France, Oct. 1998, pp. 278-285.

Krewell, "IntellQ0l Earnings Plummet," Cahners Microprocessor, vol. 15, No. 5, May 2001, 1 pages total.

Krewell, "Intel's McKinley Comes into View," Cahners Microprocessor, vol. 15, No. 10, pp. 1, Oct. 5, 2001.

Kumar, "Measuring Parallelism in Computation-Intensive Scientific/Engineering Applications," IEEE Transactions on Computers, vol. 37, No. 9, pp. 1099-1098, Sep. 1988.

Lam et al., "Limits of Control Flow on Parallelism," i Proceedings of the 19th Annual International Symposium on Computer Architecture.Gold Coast, Australia: IEEE and ACM, May 1992, pp. 46-57.

Lebeck et al., "A Large, Fast instruction Window for Tolerating Cache Misses," in Proceedings of the 29th Annual International Symposium on Computer Architecture. Anchorage, Alaska, USA: ACM, May 25-29, 2002, 12 pages total.

Lee et al., "Branch Prediction Strategies and Branch Target Buffer Design," Computer, vol. 17, pp. 8-22, Jan. 1984.

Lepak et al., "On the value locality of store instructions," in Proceedings of the International Symposium on Computer Architecture, pp. 182-191, Jun. 2000.

Lilja, "Reducing the Branch Penalty in Pipelined Processors," Computer, vol. 21, pp. 47-55, Jul. 1988.

Lipasti et al., "Superspeculative Microarchitecture for Beyond AD 2000," IEEE Computer, vol. 30, No. 9, pp. 59-66, Sep. 1997.

Lipasti et al., "Value Locality and load Value Prediction," in Proceedings of the Seventh Annual International Conference on Architectural Support for Programming Languages and Operating Systems (ASPLOS-VII). Boston, MA: IEEE and ACM, Oct. 1996, pp. 138-147.

Mahike et al., "A Comparison of Full and Partial Predicated Execution Support for ILP Processors," in Proceedings of the 22nd Annual International Symposium on Computer Architecture, pp. 138-149, IEEE and ACM, May 1995.

Martin et al., "Timestamp snooping: An approach for extending smps," in Proceedings of the International Conference on Architectural Suport for Programming Languages and Operating Systems, pp. 25-36, Nov. 2000.

Morano et al., "Implications of Register and Memory Temporal Locality for Distributed Microarchitectures," Dept. of Electrical and Computer Engineering, Northeastern University, Boston, MA, USA, Technical Report, Oct. 2002, pp. 1-20, URL:http://www.ece.neu.edu/groups/nucar/publications/interva Is.pdf.

Morano et al., "Realizing High IPC Through a Scalable Memory-Latency Tolerant Multipath Microarchitecture," in Proceedings of the Workshop on Chip Multiprocessors: Processor Architecture and Memory Hierarchy Related Issues (MEDEA2 002), at PACT2002. Charlottesville, Virginia, USA, Sep. 22, 2002, pp. 16-25. Also appears in ACM Sigarch Computer Architecture Newsletter, Mar. 2003, URL: http://www.ele.uri.edu/-uht/papers/MEDEA2002final.pdf.

Morano, "Execution-Time Instruction Predication," Dept. of Electrical and Computer Engineering, University of Rhode Island, Kingston, RI 02881, Technical Report 0320020100, Mar. 2002, pp. 1-10, URL:http://www.ele.uri.edu/-uht/papers/Levo3TR032002-0100.pdf.

Nagarajan et al., "A Design Space Evaluation of Grid Processor Architectures," in Proceedings of the 30th Annual ACM/IEEE International Symposium on Microarchitecture. Austin, Texas, USA: ACM, Dec. 2001, pp. 40-51.

Pajuelo et al., "Speculative Dynamic Vectorization," in Proceedings of the 29th Annual International Symposium on Computer Architecture. Anchorage, Alaska, USA: ACM, May 25-29, 2002.

Papworth, "Tuning the Pentium Pro Microarchitecture," IEEE Micro, vol. 16, No. 2, pp. 8-15, Apr. 1996.

Parcerisa et al., "Efficient Interconnects for Clustered Microarchitectures," in Proceedings of the Eleventh International Conference on Parallel Architectures and Compilation Techniques. Charlottesville, Virginia, USA: IEEE, Sep. 22-25, 2002 10pages total.

Park et al., "Reducing Register Ports for Higher Speed and Lower Energy," In Proceedings of the 35th Annual International Symposium on Microarchitecture. Istanbul, Turkey: IEEE, ACM, Nov. 2002, 12 pages total.

Patt et al., "HPS, a New Microarchitecture: Rationale and Introduction," in Proceedings of the Eighteenth Annual Workshop on Microprogramming (MICRO-18):IEEE and ACM, Dec. 1985, pp. 103-106.

Popescu et al., "The_Metaflow Architecture," IEEE MICRO, vol. 11, No. 3, Jun. 1991, pp. 10-13 & 63-73.

Preston et al., "Design of an 8-wide Superscalar RISC Microprocessor with Simultaneous Multithreading," in Proceedings of the International Solid State Circuits Conference, Jan. 2002. Slides from talk at conference also referenced, 6 pages total.

Raasch et al., "A Scalable Instruction Queue USing Dependence Chains," in Proceedings of the 29th Annual International Symposium on Computer Architecture. Anchorage, Alaska, USA: ACM, May 25-29, 2002, 12 pages total.

Rau et al., "Instruction-level parallel processing: History, overview and perspective," International Journal of Supercomputing, vol. 7, pp. 9-50, Oct. 1996.

Rau et al., "The cydra 5 departmental supercomputer: Design and philosophies, decisions and tradeoffs ," IEEE Computer Magazine, vol. 22, pp. 12-34, Jan 1989.

Riseman et al., "The Inhibition of Potential Parallelism by Conditional Jumps,"IEEE Transactions on Computers, vol. C-21, No. 12, pp. 1405-1411, Dec. 1972.

Rotenberg et al., "Control independence in trace processors," In IEEE Symposium on Microarchitecture, pp. 4-15, Dec. 1999.

Rotenberg et al., "Trace processors," in IEEE Symposium on Microarchitecture, pp. 138-148, Dec. 1997.

Sankarallingam et al., "Exploiting ILP, TLP , and DLP with the Polymorphous TRIPS Architecture," in Proceedings of the 30th Annual International Symposium on Computer Architecture. San Diego, California, USA: ACM and IEEE, Jun. 9-11, 2003, 12 pagestotal.

Sazeides et al., "The Performance Potential of Data Dependence Speculation & Collapsing," in Proceedings of the 29th International Symposium on Microarchitecture (MICRO-29):IEEE and ACM, Dec. 1996, pp. 238-247.

Sazeides et al., "The predictability of data values," in Proceedings of the 30th International Symposium on Microarchitecture, pp. 248-258, Dec. 1997, 11 pages total.

Seznec et al., "Register Write Specialization Register Read Specialization: A Path to Complexity-Effective Wide-Issue Superscalar Processors," in Proceedings of the 35th Annual International Symposium on Microarchitecture. Istanbul, Turkey: IEEE,ACM, Nov. 2002, 12 pages total.

Smith et al., "Boosting Beyond Static Scheduling in a Superscalar Processor," in Proceedings of the 17th Annual International Symposium on Computer Architecture, pp. 344-354, IEEE and ACM, May 1990.

Smith, "A Study of Branch Prediction Strategies," in Proceedings of the 8th Annual Symposium on Computer Architecture, pp. 135-148, IEEE and ACM, 1981.

Smith, "Architecture and Applications of the HEP Multiprocessor Computer," Society of Photo-optical Instrumentation Engineers, No. 298, pp. 241-248, 1981.

Sohl et al., "Multiscalar processors," in Proceedings of the International Symposium on Computer Architecture, IEEE and ACM, pp. 414-425, Jun. 1995.

Su et al., "Gurpr-A Method for Global Software Pipelining," in Proceedings of the Twentieth Annual Workshop on Microprogramming (MICRO-20), Association of Computing Machinery, pp. 88-96, Dec. 1987.

Taylor et al., "The Raw Microprocessor: A Computational Fabric for Software Circuits and General-Purpose Programs," IEEE Micro, vol. 22, No. 2, pp. 25-35, Mar.-Apr. 2002.

Thornton, "Parallel operation in control data 6600," in Proceedings of the AFIPS Fall Joint Computer Conference, pp. 33-40, 1964.

Tjaden et al., "Representation of Concurrency with Ordering Matrices," IEEE Transactions on Computers, vol. C-22, No. 8, pp. 752-761, Aug. 1973.

Tjaden, "Representation and Detection of Concurrency Using Ordering Matrices," Ph. D. Thesis, The Johns Hopkins University, 199 pages total, 1972.

Tomasuio, "An Efficient Algorithm for Exploiting Multiple Arithmetic Units," IBM Journal of Research and Development, vol. 11, No. 1, pp. 25-33, Jan. 1967.

Tubella et al., "Control speculation in multithreaded processors through dynamic loop detection," in Proceedings of the 4th Symposium on High Performance Computer Architecture, pp. 1423, Jan. 1998.

Tullsen et al., "Simultaneous Multithreading: Maximizing On-Chip Parallelism," in Proceedings of the 22nd Annual International Symposium on Computer Architecture: ACM, Jun. 22-24, 1995, pp. 392-403.

Uht et al., "Branch Effect Reduction Techniques," IEEE Computer, vol. 30, No. 5, pp. 71-81, May 1997.

Uht et al., "Disjoint Eager Execution: An Optimal Form of Speculative Execution," in Proceedings of the 28th International Symposium on Microarchitecture, MICRO-28, pp. 313-325, ACM-IEEE, Nov./Dec. 1995.

Uht et al., "Realizing High IPC Using Time Tagged Resource Flow Computing," in Proceedings of the Euro-Par 2002 Conference, Springer-Verlag Lecture Notes in Computer Science. Paderborn, Germany: ACM, IFIP, Aug. 28, 2002, pp. 490-499. URL;http://www.ele.uri.edu/-uht/papers/EuroPar2002.ps.

Uht, "A Theory of Reduced and Minimal Procedural Dependencies," IEEE Transactions on Computers, vol. 40, No. 6, pp. 681-692, Jun. 1991. Also Appears in the tutorial "Instruction-Level Parallel Processors", Torn, H.C., and Vassiliadis, S., Eds., IEEEComputer Society Press, 1995, pp. 171-182.

Uht, "An Efficient Hardware Algorithm to Extract concurrency From General Purpose Code," in Proceedings of the Nineteenth Annual Hawaii International Conference on System Sciences, Jan. 1988, pp. 41-50.

Uht, "Concurrency Extraction via Hardware Methods Executing the Static Instruction Stream," IEEE Transactions on Computers, vol. 41, No. 7, pp. 826-841, Jul. 1992.

Uht, "Hardware Extraction of Low-Level Concurrency from Sequential Instruction Streams," PhD thesis, Electrical and Computer Engineering, Carnegie-Mellon University, Pittsburgh, Dec. 1985, 200 pages.

Uht, "High Performance Memory System for High ILP Microarchitectures," Technical Report 0797-0002, Department of Electrical and Computer Engineering, University, of Rhode Island, Aug. 26, 1997. Available via http://ele.url.edu/-uht, 10 pages total.

Wallace et al., "Threaded Multiple Path Execution," in 25th Annual International Symposium on Computer Architecture: ACM, Jun. 1998, pp. 238-249.

Wanisch et al., HDLevo-VHDL Modeling of Levo Processor Components, Department of Electrical and Computer Engineering, University of Rhode Island, Kingston, RI, Technical Report 072001-100, Jul. 20, 2001, URL:http://www.ele.url.edu/-uht/papers/HDLevo, pdf, 36 pages total.

Wu et al., "Compiler Managed Micro-cache Bypassing for High Performance EPIC Processors," in Proceedings atfhe 35th Annual International Symposium on Microarchitecture. Istanbul, Turkey: IEEE, ACM, Nov. 2002, 12 pages total.

Xilinx Staff, "Gate Count Capacity Metrics for FPGAs," Xilinx Corp., San Jose, CA, Application Note XAPP 059 (Y.1.1), Feb. 1, 1997, URL: http://www.xilinx.comIxapp/xapp059.pdf. accessed: Jun. 2001, 6 pages total.

Zahir et al., "Os and compiler condsiderations in the design of the is-64 architecture," in Proceeedings of the International Conference on Architectural Suport for Programming Languages and Operating Systems, pp. 212-221, Nov. 2000.

Augustus K Uht, "Overview of the Levo High-ILP Computer", University of Rhode Island, Dept. of Electrical and Computer Engineering, Technical Report No. 0797-0001, pp. 1-19.

* cited by examiner

FIG. 14 — AN 'X' MARKS AN EXECUTION

FIG. 15 — AN 'X' MARKS AN EXECUTION

FIG. 16 — AN 'X' MARKS AN EXECUTION, AN 'R' MARKS A RELAY OPERATION

FIG. 17 — AN 'X' MARKS AN EXECUTION, AN 'R' MARKS A RELAY OPERATION

FIG. 18 — AN 'X' MARKS AN EXECUTION, AN 'R' MARKS A RELAY OPERATION, A 'B' MARKS A BROADCAST-ONLY OPERATION, A 'D' MARKS AN EXECUTION IN A DEE PATH

CONCURRENT EXECUTION OF INSTRUCTIONS IN A PROCESSING SYSTEM

CROSS REFERENCE TO RELATED APPLICATIONS

This application is a Divisional of co-pending application. No. 11/248,374 filed Oct. 11, 2005 which is a divisional of application Ser. No. 09/828,600 filed Apr. 6, 2001, granted as U.S. Pat. No. 6,976,150 on Dec. 13, 2005, which claims priority from the provisional application designated Ser. No. 60/194,931, filed Apr. 6, 2000, the entire contents of all are hereby incorporated by reference.

TECHNICAL FIELD

The invention relates to the field of computing devices, and in particular to a scalable computing device that employs a time tag that indicates the nominal sequential order that program instructions execute.

BACKGROUND OF THE INVENTION

Traditionally, computers have used a control flow model of program execution. This model is an imperative model, that is, the user tells the computer which instructions to execute and when. Instructions may be conditionally executed or repeatedly executed with the use of branches at the machine level. A branch causes the computer to (conditionally) change the order in which instructions are to be executed. In the traditional model instructions are executed one at a time, strictly in the specified order.

In recent years computer designers have sought to improve performance by executing more than one instruction at a time and possibly out-of-order. This is an exploitation of instruction Level Parallelism (ILP), also popularly known as a "superscalar" approach. ILP is possible because not all instructions' inputs come from immediately-prior instructions.

Ignoring control flow for the minute, the only necessary constraint to ensure correct program execution is to generate instruction results before they, are supposed to be used by other instructions. Thus, say an instruction x=y+z is waiting to execute; as soon as both of its inputs Y and z have been generated the instruction may execute or "fire", sending inputs to an adder, the adder performing the operation and then saving the result in variable or register x. Instructions waiting for the new value of x, that is having x as an input, may then potentially fire themselves. This is a case of the waiting instruction being data dependent on the former. This type of execution model is often referred to as the data flow model.

Modern processors present the appearance of the traditional control flow model to the user, but employ a data flow model "under the hood". Thus, the relative conceptual simplicity of the control flow model is maintained with the improved performance of the data flow model.

In the data flow model branches must still be used and are problematic. The typical approach today is to predict the outcome of conditional branches and then speculatively execute the corresponding code. Once the value of the branch condition is known, the branch is said to have been resolved. If the prediction was correct, nothing special needs to be done. However, if there was a misprediction, the computer must effectively reset its state to what it was just before the branch was first encountered. Even though branch prediction accuracies for real code are generally at or above 90%, mispredictions are still an impediment to obtaining higher performance.

In prior work we demonstrated a variation of branch speculation called Disjoint Eager Execution (DEE) which may vastly improve computer performance. See, for example the paper by A. K. Uht and V. Sindagi, entitled *"Disjoint Eager Execution: An Optimal Form of Speculative Execution"*, Proceedings of the $28^{th}$ International Symposium on Microachitecture (Micro-28), pp. 313-325. IEEE and ACM, November and December 1995, incorporated herein by reference. DEE is a form of multipath execution; code is executed down both paths from a branch. The code execution is unbalanced; code on the predicted or Main-Line (ML) path is given preferential priority for execution resources over code on the not-predicted path. When the branch resolves, results for either branch direction are available, and hence the performance penalty due to a misprediction is greatly reduced. ILP of the order of ten's of instructions executing at once was, shown to be possible, as compared with an ILP of 2-3 instructions in existing processors.

Our prior proposed machine realization of DEE with a data flow equivalent required many large and cumbersome data dependency and control dependency bit matrices. Data and control issues were treated separately. Approaches to reducing the size of the matrices were partially devised but never proven.

Other approaches, including current microprocessors, also need a lot of hardware to realize data flow even with simple branch prediction. In particular, data dependencies must still be computed and other complex operations performed for code to be correctly executed. Hence all of these other ILP approaches are not scalable in that their hardware cost typically grows as the square of the number of execution units in the machine.

Other researchers have demonstrated the value of data speculation. See for example, the papers by M. H. Lipasti, C. B. Wilkerson and J. P. Shen, *"Value Locality and Load Value Prediction"*, in Proceedings of the Seventh Annual International Conference on Architectural Support for Programming Languages and Operating Systems (ASPLOS-VII), pp. 138-147, ACM, October 1996, and Y. Sazeides, S. Vassiliadis and J. E. Smith, *"The Performance Potential of Data Dependence Speculation & Collapsing"* in Proceedings of the $29^{th}$ International Symposium on Microarchitecture (MICRO-29), pp. 238-247, IEEE and ACM, December 1996. Both papers are hereby incorporated by reference. In this scenario, input values for some instructions are predicted and the instructions allowed to execute speculatively. As with control speculation, there is a penalty for data value misprediction. No on has yet, to our knowledge, combined data speculation with DEE.

SUMMARY OF THE INVENTION

Briefly, according to an aspect of the present invention, a scalable processing system includes a memory device having a plurality of executable program instructions, wherein each of the executable program instructions includes a timetag data field indicative of the nominal sequential order of said associated executable program instructions. The system also includes a plurality of processing elements, which are configured and arranged to receive executable program instructions from the memory device, wherein each of the processing elements executes executable instructions having the highest priority as indicated by the state of the timetag data field.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 14: Timing of the code example, data scenario 4. In this example an output data broadcast from instruction 00 in time cycle 4 enables one later instruction to execute but not one later still in the program order. Execution of an instruction at a given time is again indicated by an 'X';

FIG. 15: Timing of the code example, data scenario 5. In this example an output data broadcast is shown being delayed by the processing of being forwarding to a following forwarding span through the use of the forwarding register. Execution of an instruction at a given time is again indicated by an 'X';

FIG. 16: Timing of the code example, prediction scenario 1. This example illustrates the exploitation of basic minimal control dependencies, a significant contribution to achieving higher ILP by taking advantage of independent instructions beyond the joins of branches. Execution of an instruction at a given time is again indicated by an 'X';

FIG. 17: Timing of the code example, prediction scenario 2. This example illustrates a relay operation that can occur within an active station when a branch predicate changes. Execution of an instruction at a given time is again indicated by an 'X'. A relay operation is indicated by an 'R'; and FIG. 18: Timing of the code example, predication scenario 3. This example illustrates a switch of a DEE path to become the new main-line path. Execution of an instruction at a given time is again indicated by an 'X', a relay operation is indicated by an 'R', a broadcast-only operation is indicated by a 'B' and an execution in a DEE path is indicated by a 'D'.

DETAILED DESCRIPTION OF THE INVENTION

The basic model of execution of the subject invention is radically different from what has come before. The new model is the resource flow or squash flow execution model. There are a few key concepts of this model that describe its operation and characteristics.

1. As with most processors, candidate instructions for execution are loaded from memory into an instruction window. This is high-speed storage present processor itself. When instructions fire they are sent with their data inputs to Processing Elements (execution units such as adders, etc.) for execution.
2. Unlike most processors, the invention has associated with each candidate instruction a time tag indicating the instruction's nominal sequential order in the program being executed.
3. The basic resources of the computer, the Processing Elements (PE) containing the adders, multipliers and logic functions, always execute the instructions with the highest priority. The PE's always look for work, hence the "resource flow" terminology; this could also be called "resource-driven".
4. Instructions execute regardless of their data or control dependencies. Instructions execute or re-execute only when one of more of their inputs has changed value; thus when an input changes value the instruction effectively squashes or nullifies its current result and generates a new, updated value for the result.
5. Newly-generated results are broadcast to all later instructions in the window, along with the results' identifying addresses and time tags.
6. Instructions in the window look at or "snoop" the broadcast information, copying or "snarfing" matching results for their input(s). If there is a match, and the broadcast value differs from the current value of the input, such 5. instructions fire and the process repeats.

Other aspects of the invention include:
1. Full hidden-explicit predication is used to realize control flow.
2. Instructions include predicate inputs and outputs. The inputs tell the instruction when its result should modify the state of the machine (classically, this is equivalent to indicating whether or not an instruction should execute). The outputs are fed to other instructions. The major predicate outputs are those from branches.
3. Predicate inputs and outputs are treated the same as instruction data inputs and outputs: predicate (and data) instruction outputs are recomputed only if a predicate input (or data input) changes value; the newly-generated results are broadcast with their address and time identifiers to all of the instructions in the window.

The following sections provide detailed descriptions of components of the present invention.

Figure 1:
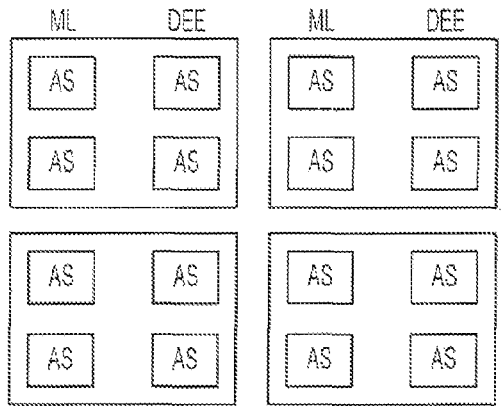
FIG. 1: Sharing Groups: Four sharing groups are shown, each having two ML and two DEE active stations. Normally one PE is assigned to and services the execution demands of one sharing group. 'AS' stands for Active Station; each AS holds one instruction.

High-Level Microarchitecture:

Instructions in the resource flow computer device are combined into novel sharing groups in order to share certain machine resources, including processing elements (PE's), see FIG. 1. Only one instruction in a group may supply source data to the group's PE in a given cycle. The output of the PE goes back to the corresponding instruction, as well as being broadcast to stations and groups later in the nominal temporal sequential order.

Figure 2:
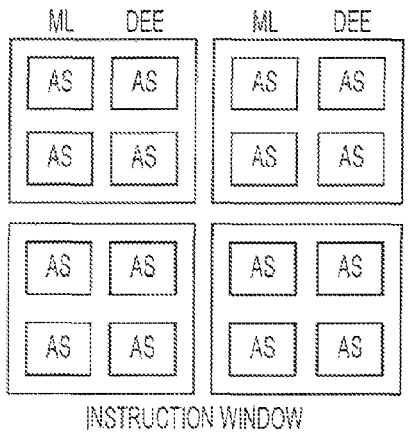
FIG. 2: Resource flow computer high level microarchitecture. The primary differentiating component is the instruction window.
Figure 2:
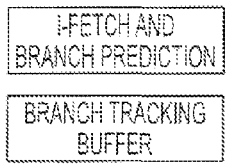

A block diagram of the high-level microarchitecture of the resource flow computer is illustrated in FIG. 2. The memory system is designed to satisfy the bandwidth requirements of the processor; it includes appropriately many levels and sizes of caches and memory banks. The instruction fetch hardware supplies the instruction bandwidth needed by the processor.

There are preferably a large number of PE's available to execute instructions. Each PE is preferably able to execute any type of instruction in the instruction set of the computer. As such they are general devices. Although we will use this PE model for discussion purposes in the following text, the PE's may be divided into multiple functional units, each one specialized for one or more particular functions, e.g., floating point operations; this is standard practice. Typically there may be thirty-two (32) PE's in a resource flow computer device.

The instruction window holds a subset of the instructions in the program being executed in the static order. The static order is the order of instructions as they have been written, or in other words the order they exists in memory. This order is nominally independent of the actual dynamic execution of the control flow (branches) and hence is relatively easier to generate than a dynamically-ordered window. In practice, the order of the code in the window is a combination of the static and dynamic orders.

Figure 3:
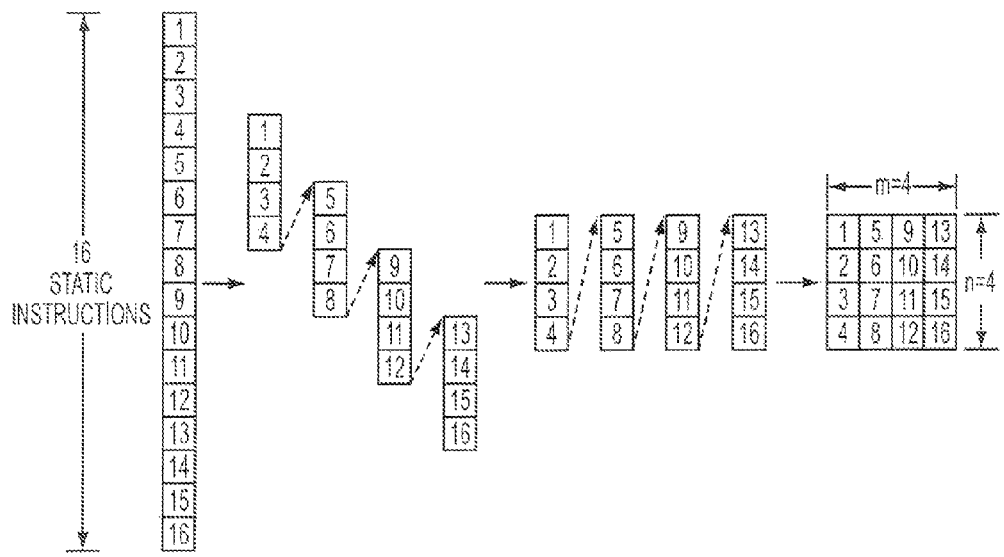
FIG. 3: Folding the Instruction Window. An instruction window (IW) nominally 16 static instructions long is shown logically (on the left) and folded (on the right). Each box represents an active station, ordered in time as indicated by the numbers, larger numbers being later in time. An active station holds one instruction.
Figure 4:
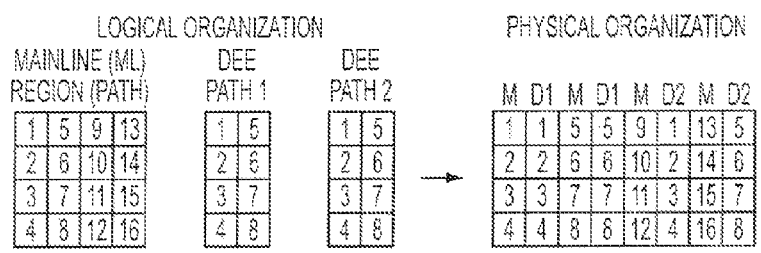
FIG. 4: Instruction Window with DEE. The instruction window is shown with the DEE paths incorporated (interlaced) with the ML path. In the Physical Organization, M is the ML column, D1 is DEE path 1 and D2 is DEE path 2.

In order to make the assignment of resources to instructions easier and less expensive, the instruction window is folded as illustrated in FIG. 3, for example, for a 4-by-4 window. All instructions on a single row share one resource, such as a register file copy. Thus, each register file copy serves every fourth instruction. Instructions corresponding to DEE paths are physically arranged as shown in FIG. 4.

The load buffer is a staging area for fetching and holding instructions until the buffer is filled and the instruction window is ready to accept a new buffer's worth of instructions. Typically, this involves fetching a number of instructions equal to the number of instruction rows every cycle. The fetched instructions are shifted from the fetch buffer into the instruction window when the buffer is full and the first column of instructions in the window, the earliest, have been fully executed (their results will not change).

The logical ISA register file (ISAR) holds the current values of the registers present in the Instruction Set Architecture (ISA) of the computer, that is, the registers visible to the user. The ISAR is constantly updated with values generated by the PE's; therefore, the ISAR holds the latest-generated values of registers. As part of instruction fetching, the source values, or data inputs, of each new instruction are initialized to the values held in the ISAR. Other types of data speculation may be substituted or added to this basic technique.

Figure 5:
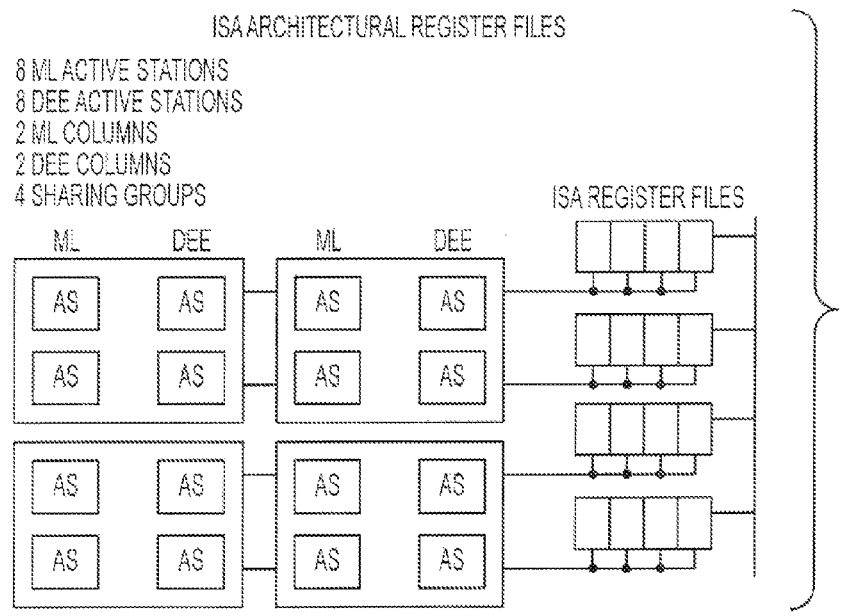
FIG. 5: Microarchitecture of the ISA Register File. The ISA register file is replicated once for each row of the instruction window. All active stations in the rightmost (later) column are loaded simultaneously, each station from the file associated with its row. The files are triple-read ported, since an active station may have two regular register sources and one relay register source (these are described later)

The ISAR is physically realized with multiple copies of the same ISAR file, see FIG. 5. Each copy is associated with a single row of active stations. A file is read when the rightmost column of the active stations is loaded from the load buffer. Reads from a file go to the rightmost active station on the same row. Writes to the ISAR may be made simultaneously from every sharing group of the instruction window, one write per group per cycle; each copy is updated with the value of its corresponding write. Since all of the writes may be to the same register address and all of the register file copies must contain the same data (must be coherent), a novel technique is used to resolve multiple writes to the same address; it is described later in this document.

Figure 6:
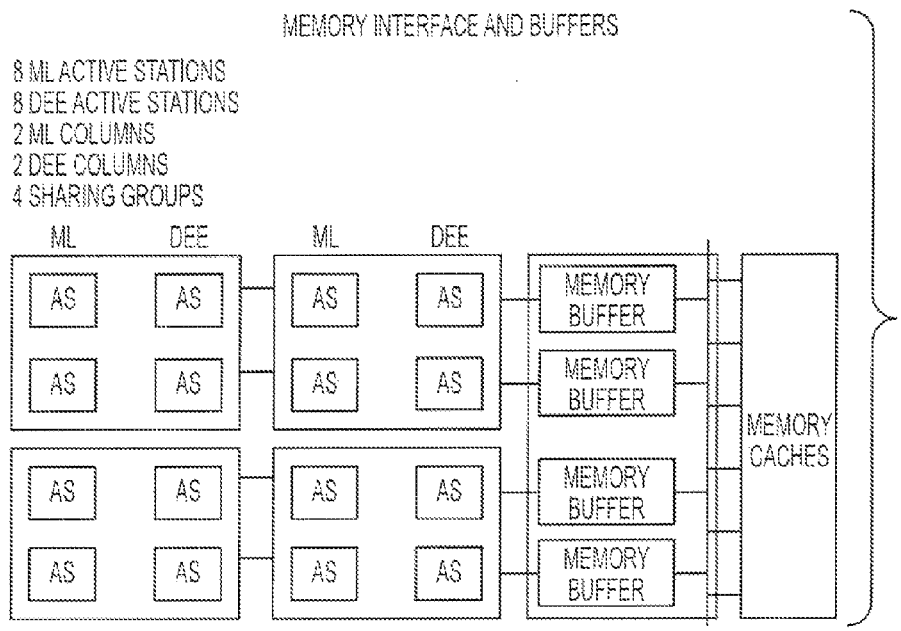
FIG. 6: Memory system. A suggested memory system for the resource flow computer.

The core of the machine (the instruction window) interfaces to main memory through a memory interface, illustrated in FIG. 6. This memory interface filters memory reads to see if they can be satisfied by outstanding memory reads or writes to the same address. Memory references to different addresses may be out-of-order, unless they go to the Input/Output section of the computer. Memory reads and writes to the same address are also filtered to maintain a correct program order of memory references between homogenous groups of reads and groups of writes. References within either type of group may be out-of-order with respect to the instruction window. Write references to the same address are kept in-order with respect to the memory itself. In some cases multiple writes to the same address can be reduced to a single write. Further details of how this memory interface functions is provided in the technical report entitled "High Performance Memory System for High ILP Microarchitectures". See the paper by Uht. A. K., entitled *"High Performance Memory System for High ILP Microarchitectures"*, Technical Report 0797-0002, Department of Electrical and Computer Engineering, University of Rhode. Island, Aug. 26, 1997. This paper is also incorporated herein by reference. This is the suggested memory system for the resource flow computing device, designed to provide high bandwidth and low latency. Other memory systems with similar attributes may be used with suitable modification.

The branch predictor predicts branches as they are encountered by the instruction loader. A prediction is used to set the values of the predicates of instructions loaded after the branch. These initial predicate values are loaded into the instruction window with each instruction.

Every cycle of the instruction in each sharing group with the highest priority (earliest in the order, With ML before DEE stations) that is ready to execute is issued to the PE corresponding to the instruction's sharing group. Included with the issuing data are the address of the result and the time tag of the instruction (same as the time tag of the result). Once the PE has finished computing a value for an instruction, the value with its address and time tag is logically broadcast to all instructions later in the instruction window. As is described later, the preferred embodiment does not actually broadcast all results directly to every station. According to three conditions to be specified later, an instruction in the window may copy the value into its storage. This method of data communication among stations in the window using time tags is novel.

Instruction Window and Time Tags: Each instruction in the instruction window has associated with it a dynamically changing time tag. The time tag is formed as the concatenation of the column address of the instruction with the row address of the instruction. This composite tag is just the position of the instruction in the window. In the following discussion, for the sake of simplicity we assume that the time tags are fixed with respect to the physical instruction cells. In reality, the columns of cells can be renamed, i.e., any physical column can effectively be the "leftmost" column.

When every instruction in the leftmost or earliest column has finished executing, the column is retired by effectively shifting the entire window contents to the left by one column. This changes the time tags of every instruction in the window, effectively decrementing the column address part of every instruction's time tag by one. The automatic updating of the time tags throughout the window is novel. The results from the retired column are sent to both the register file copies and the memory system, as appropriate.

Each instruction cell in the instruction window has both storage and logic in it or associated with it and is called an active station.

Sharing Groups, and Result Forwarding: As previously mentioned, active stations within the instruction window are grouped together in order to allow for sharing of expensive execution resources. Such resources can range from an entire processing element that can execute any instruction to specialized functional units. Implementations can also include the situation of having just one active station in a sharing group. FIG. 2 illustrates an instruction window with four sharing groups, each group contains two ML active stations and two DEE active stations.

Execution output results (ISA architecturally intended to be sent to the ISA registers) from sharing groups must be forwarded to those active stations located forward in program execution order (having later valued time tags). This is accomplished with result forwarding buses, illustrated in FIG. 7. Although logically it is necessary to allow an output from the first active station to be used by the last active station, normally this does not happen. In fact, register lifetimes, the number of instructions between the write of a register and the last time that value is read (before the register is written again) have been demonstrated to be fairly small, say 32 instructions. See for example, the paper by T. M. Austin and G. S. Sohi, "*Dynamic Dependency Analysis of Ordinary Programs*" in Proceedings of the 19$^{th}$ Annual International Symposium on Computer Architecture, Gold Coast, Australia, pp. 342-351, IEEE and ACM, May 1992. Therefore results are not necessarily immediately forwarded to all later active stations. The entire forwarding bus concept is novel.

Because instruction output results only need to be forwarded for the lifetime of the ISA register in the program, in the present invention results are first forwarded a number of active stations that roughly matches a typical register lifetime. This forwarding distance is termed the forwarding span. Each active station snoops all forwarding buses from the last span's-worth of active stations to get the register inputs needed for its execution. Each sharing group originates a forwarding bus that covers the implementation's designated forwarding span. For example, if an instruction window includes 256 ML active stations and these are further divided into sharing groups containing eight active stations from an ML column (and eight from a DEE column), then there would be 32 sharing groups each originating a forwarding bus. If we assume a forwarding span of thirty-two this means that at any active station there would be span-length/group-size=32/8=4 forwarding buses that would need to be snooped by each source input.

Figure 8:
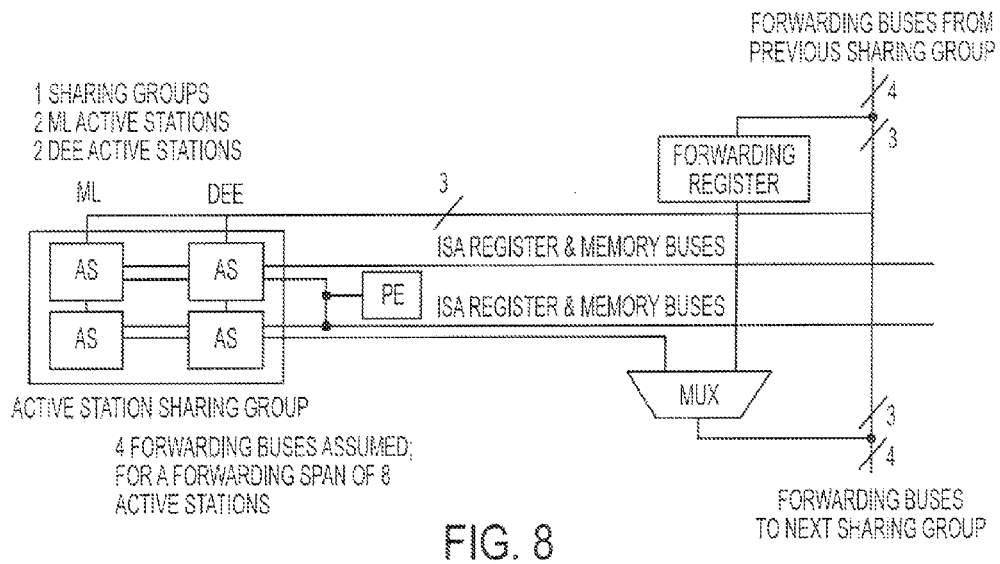
FIG. 8: Sharing group forwarding structure. Each group has these components and connections to achieve result forwarding beyond a forwarding span.

In order to handle situations where an output result from an instruction is needed in instructions located beyond the forwarding span of its forwarding bus, there exists a register at the end of the bus (located in the sharing group just after the last group snooping the bus). This register is termed the forwarding register see FIG. 8. This register then contends with the forwarding requests originating in its sharing group to forward its result on that sharing group's forwarding bus. The process results in output values being forwarded for the next forwarding span number of active stations. This forwarding process is repeated across multiple spans and is stopped when the forwarding span of a result contains an active station having an output with the same ISA register destination as the result. The later instruction originating a new value for that ISA register is now responsible for forwarding its output value in the same manner.

Note that when instruction output results need to be forwarded to stations beyond the implementation forwarding span, there is at least one clock cycle delay in the forwarding process due to the presence of the forwarding register. This register is needed because of possible contention for the forwarding bus of the sharing group the forwarding register is associated with. Note that more than one clock cycle delay may be incurred if the sharing group that is performing the forward also needs to forward one of its results in the same clock cycle. Delaying a forward from a previous sharing group will not typically be a performance problem since the need for a result created a long time in the past is not as urgent as needing a result that was generated in the more recent past of the program instruction stream.

Other Notes on the Static Instruction Window: If a loop is contained completely within the window, we say that "loop capture" has occurred. In this situation instruction loading stops, and the machine is potentially able to execute instructions much faster, since there is temporarily no instruction fetching from the memory going on.

Backward branches are handled by converting them to forward branches when loop capture occurs as follows. Briefly, before the branch is loaded into the window its relative branching or target address is changed from negative to positive, and the instructions within the branch's domain are reloaded after the branch. This is repeated until the first converted copy of the backward branch is in the leftmost column of the window. Loading then ceases and the instructions in the branch's domain are re-enabled as the branch executes its iterations.

Scalability: One of the key advantages of this invention is that it provides an ILP machine that is scalable. By "scalable", we mean that the hardware cost (amount of hardware) of the machine grows linearly with the number of Processing Elements. Machines with dependency matrices grow at least as quickly as the square of the number of PE's. The hardware cost of existing machines also typically grows with the square of the number of PE's.

The hardware cost of the resource flow machine grows no faster than linearly since there is no dependency storage, generation or checking hardware, and because the size of the forwarding buses is fixed, that is, the forwarding span normally stays the same regardless of the number of PE's or active stations. Since the number of buses grows as a constant fraction of the number of active stations, the hardware cost of the buses also grows linearly with the number of PE's.

Absolute Hardware Cost: A preliminary spreadsheet analysis indicates that one embodiment of the invention will use approximately 25 million transistors, including the 32 PE's. Notably, this is under the typical limit quoted for designs of high-end microprocessors getting underway in the near future: 100 million transistors. It is also well under the 1 billion transistors often postulated as being available on a chip in the not terribly distant future.

Logic Delay: The present invention also has advantages over competing designs in its circuit delays. Typically, a processor's performance is highly tied to the operating frequency of its clock; the greater the frequency, the better the performance. Thus, keeping the clock cycle time (equal to the inverse of the clock frequency) low is paramount. One of the major objections to building processors that exploit much ILP while determining the parallel instructions in hardware ("brainiacs") is that signals need to be sent across much of the chip. As chips have increased their hardware densities and as clock frequencies have increased, it takes more (multiple) clock cycles for a signal to cross a chip. Therefore, any design that requires global chip communication for all operations is at a large disadvantage: the increase in ILP obtained will be at least partially offset by a larger cycle time (reduced frequency) or a greater number of cycles to perform a given amount of work.

The resource flow computer solves this problem by keeping most communication among the active stations local. First, note that communication between active stations should normally be completed in less than a cycle. With the forwarding bus architecture of the invention, most of the time a given active station will only communicate with the number of active stations in a forwarding span, much smaller than the total number of active stations. Further, it is likely that chip layout optimizations can be performed to keep the total forwarding span length of a single bus short, taking up a fraction of a dimension of a chip, and thereby keeping the cycle time small.

Active Station Overview: The concept and implementation of an active station are novel and central to the operation of the resource flow computer. The active station is based on the classic Tomasulo reservation station (see "An Efficient Algorithm for Exploiting Multiple Arithmetic Units" by R. M. Tomasulo, *IBM Journal of Research and Development*, vol. 11, pp 25-33, January 1967), but has significantly more functionality. Like a reservation station, the main function is to snoop or look at one or more buses carrying the results of the computation from the processing elements, snarfing or copying the information from a bus into the station's own storage. A reservation station snarfs the data when the register address on a bus is equal to the contents of one of the station's source address registers. In a reservation, station the corresponding instruction is fired (i.e., sent to a processing element) when all of its sources have been snarfed.

Active, stations differ in the following respects:

1. Time tags and ISA register addresses are used instead of the arbitrary renaming addresses in the Tomasulo algorithm. The Tomasulo algorithm does not explicitly represent time in its reservation stations; correct execution order is maintained by having computations chained to follow the data flow of the code in the window. The resource flow computer's use of time tags allows it to dynamically change both the ordering of instructions and when instructions get new data.

2. There are three more conditions for snarfing data for a total of four conditions; for each source in the active station, the conditions are:
(a) the broadcast register address must equal the source address (same as before);
(b) the broadcast register value must be different from the current value of the source;
(c) the broadcast time tag must be less than the time tag of the source (the latter is equal to the time tag of the station);
(d) and the broadcast time tag must be greater than or equal to the time tag of the last datum snarfed for the source.

The latter two conditions ensure that only the register value produced closest to the active station, but not after it, is used by the source.

3. The active station uses a novel form of predication. The station incorporates logic to make predicate calculations.

4. There are no traditional branches held iii active stations. (However, all necessary functionality of any kind of branch can be realized with an active station, including data comparisons. A branch in the instruction stream takes up one active station cell in the window. Branches to targets outside of the window are handled in conjunction with the tracking buffer; this is discussed elsewhere in this document.)

5. The predication mechanism works similarly to the snooping and snarfing mechanism for data communication. Therefore there is a unified approach to the handling of control flow and data flow.

The operation of the resource flow computer is best understood by first examining the detailed structure and rules of operation of an active station; we do so now.

B.4 Active Station Details

Figure 9:
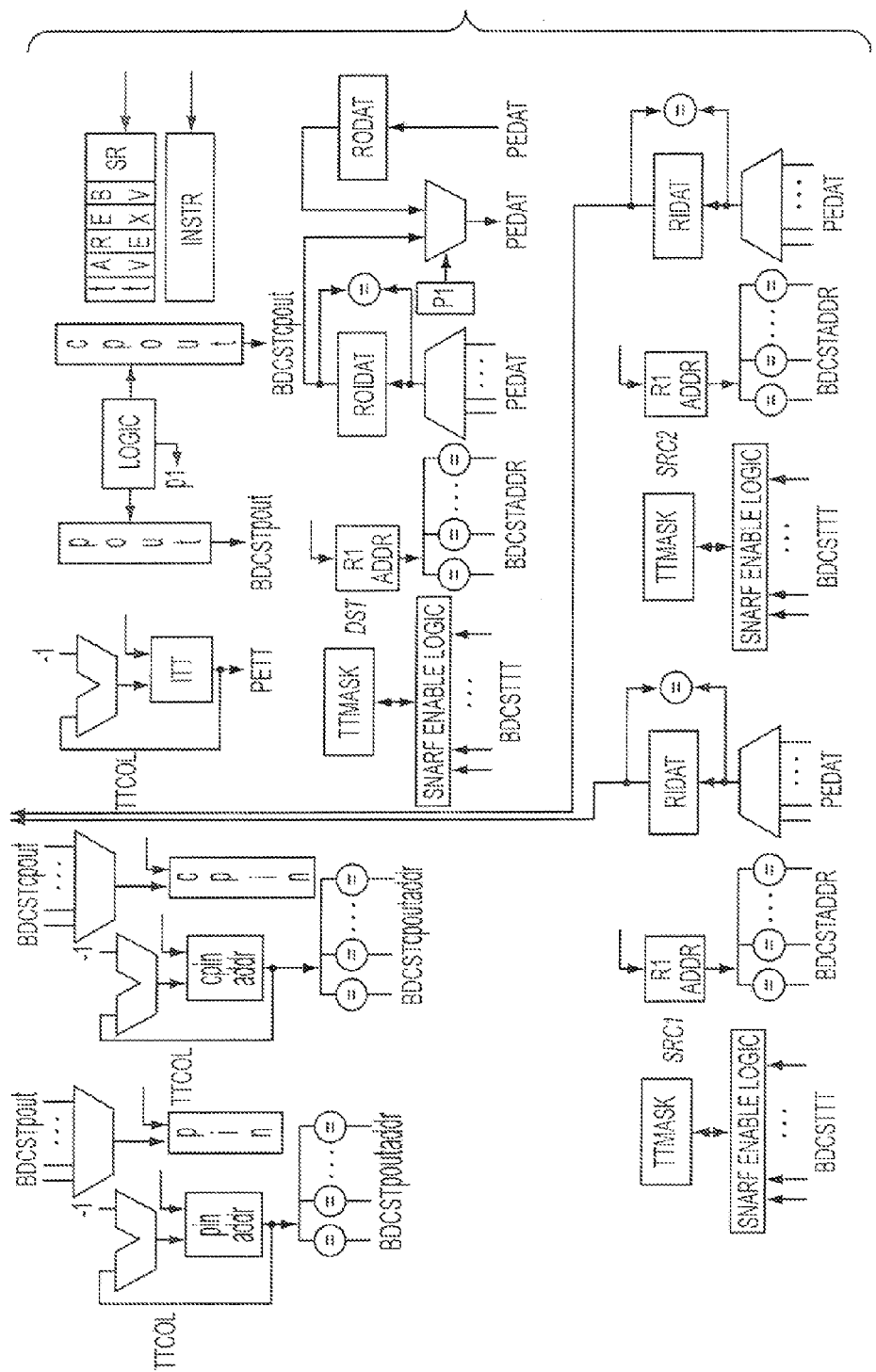
FIG. 9: Active Station. Each station has these components and connections to the rest of the CPU. Register inputs from the right come from either the load buffer or the same register in the active station on the same row of the neighboring column on the right (shift inputs). Inputs and outputs on vertical lines are to and from either the PE of the station's sharing group or the relevant broadcast buses.

Each instruction in the instruction window is held in an active station; see FIG. 9 for a structural view. We now describe the contents of each active station including both storage registers and logic. For each storage element we provide a description of the storage, its typical quantity and size, and its abbreviation [NAME]. Each active station has the following contents:

1. One or more source input data registers. These are the traditional inputs to the instruction, e.g., if the instruction is: r1<-r2 op r3 these are r2 and r3. Typically each is a 32-bit register. [RIDAT]

2. For each input data register, an input data register address register. In the example, the values held are: "2" and "3". Typically each is an 8-bit register. [RIADDR]

3. One input data register with the same address as the destination data register; in the above example the data value is rim, generated prior to this instruction. This is also referred to as the station's relay register. Typically a 32-bit register. [ROIDAT]

4. One output or destination data register; in the above example this is ri. Typically a 32-bit register. [RODAT]

5. One address register for the output (and extra input) register, e.g., "1". Typically an 8-bit register. [ROADDR]

6. For each input data register, a register containing an equivalent of the time tag of the last datum snarfed. Typically each is a 39-bit register, one bit for each earlier active station in a forwarding span snooped by this station (total of 32 bits), and one bit for each prior forwarding span (total of 7 bits). [TTMASK]

7. One input predicate register. Typically a 1-bit register. [pin]

8. One input predicate address register. Typically a 9-bit register. [pinaddr]

9. One input canceling predicate register. Typically a 1-bit register. [cpin]

10. One input canceling predicate address register. Typically a 9-bit register. [cpinaddr]

11. One output predicate register. Typically a 1-bit register. [pout]

12. One output canceling predicate register. Typically a 1-bit register. [cpout]

13. A register holding the (possibly decoded) opcode of the instruction. Size depends on realization; say it is typically a 32-bit register. [INSTR]

14. One instruction predicate; this is the value of the predicate used by the instruction itself to enable the assigning of its normal data output to the output register. Note that this is not the same as pin or pout. Typically a 1-bit register. [p1]

15. An instruction time tag register. This is sent with the operands to the PE. The PE uses it to route the result back to the station. Typically a 9-bit register. [ITT]

16. An instruction status register [SR] with the following status bits:
  (a) Instruction Issued—indicates if the instruction has been sent to a PE for execution; this is needed for multicycle instructions. [II]
  (b) Really Executed—indicates if the instruction has actually executed. Optional. Will not be further discussed herein. [RE]
  (c) Executed—indicates if the instruction has executed. This bit is cleared if a new datum or predicate or canceling predicate is snarfed, forcing the instruction to re-execute. [EX]
  (d) Branch Prediction—if the instruction is a branch, indicates the value of the last prediction or execution of the branch; 1->taken, 0->not taken. [BV]
  (e) Address Valid—if a load or store memory reference instruction, indicates if the memory address is valid (has been computed). Note that memory reference instructions execute in two phases:
  address computation, using a PE, and the actual data load or store via the memory system. [AV]

Note: explicit time tag registers are not needed for the predicate and canceling predicate since the time tag values are the same as the predicate address and the canceling predicate address. Also, it is not necessary to know the time tag of the last predicate or canceling predicate snarfed due to the predicate chaining.

Logic in or associated with each active station:

1. Column decrement logic—decrements the column part of time tags being shifted from right to left in the instruction window. One decrementer for each time tag or time tag derived address, i.e., ITT, pinaddr, and cpinaddr, for a total of three 3- or 4-bit decrementers.

2. Predicate and canceling predicate computation logic—computes p1, pout and cpout. Two AND gates and one OR gate.

3. For each data input register, an equality comparator determining whether the new value of the input data differs from the old. Typically 32 exclusive-OR gates for each of the three data inputs and combining AND-trees for each.

4. For each data input, an equality comparator to determine if the data on a broadcast bus has the same register address as the input. Typically 8 exclusive-OR gates and an AND-tree per comparator. One per broadcast bus.

5. For each TTMASK register logic to detect whether a broadcasted datum is closer in time to the station's time tag than previously snarfed data. This is conservatively estimated to be less than 1,000 transistors.

6. Predicate matching comparators, one for pin and one for cpin—equality compares (c)pinaddr with address of (canceling) predicate on each (c)p broadcast bus. Typically less than 8 exclusive-OR gates and 1 AND-tree for each predicate and canceling predicate per (c)p broadcast bus.

(c)pout are directly broadcast from the active stations, bypassing the PE's. Predicate bus congestion is alleviated by adding a bit—to each instruction indicating whether or not its predicate outputs are needed—easily determined at instruction load time with hidden-explicit predicate-assignment hardware—and then only using a (c)p broadcast bus from an active station if the predicate is needed.

7. Firing logic—takes the outputs of the comparators and determines if either the data or predicate outputs should be computed and/or broadcast. Also computes whether and which broadcast bus data or predicates should be latched into the instruction's input registers. (pout and cpout are always computed within an active station, due to the simplicity of the logic needed.)

The concept and details of an active station are novel. It is the most important component of the resource flow computer.

B.5 Operation, Including Active Station Firing Rules

Operation Overview: The operation of the invention has similarities with existing machines but also has some key differences. This section will provide a more detailed discussion of the dynamic operation of the machine as it executes a program. For the purposes of this discussion the initial boot-up of the machine will be the starting point. In other words, the machine is currently empty of any loaded or executing instructions. First an overview of the machine execution is given followed by a more detailed description of what occurs within an active station.

In general, operation of the machine will proceed from instruction-fetch, to branch target tracking, to instruction staging in the station load buffer. Next, the entire column of instructions in the station load buffer is left shifted into the right-most column of the active stations in the instruction window (reference FIG. 2). This is termed the load operation. The station Load buffer is the same length as a column in the instruction window in order for this instruction load operation to occur as a broadside left shift operation in one clock cycle. These above operations repeat until the entire instruction window is nominally loaded with instructions. Note that the authors usually use the term left-shift for describing the broadside instruction load operation but this operation can be accomplished using a renaming scheme on the active station column addresses in the instruction window. Recall that renaming allows a physical column to function as any logical column; this is transparent to the user.

Fetched instructions will also nominally be allocated cache lines in the I-cache (if the corresponding memory page and physical hardware is set to allow that). This increases the effective instruction bandwidth or maximum allowable rate of instruction fetch. As instructions are fetched they are then decoded. This is, so far, similar to most all current machines.

Once the instructions are decoded, branch type instructions are identified. The target addresses of branch instructions are computed, where possible, and an entry is made in the branch tracking buffer that includes the time tag of where that branch instruction will be placed in the instruction window when the branch is loaded. The target of the branch is also placed into the tracking buffer entry. This tracking buffer information is used to dynamically track the instruction domains of instructions within the instruction window.

Instructions are then put into the active station load buffer. The station load buffer serves as a staging area to accumulate instructions until they can enter the instruction window. When the instruction load buffer is full, and the leftmost column contains nothing but fully-executed instructions (able to be retired), an operation analogous to a left shift occurs amongst all of the active station columns and those instructions currently staged in the station load buffer. Source register values for the loading instructions are taken from the architected register files (one per instruction window row) at the time the load occurs.

Once instructions are loaded into an active station, they are allowed to compete for execution, main memory, and architected register file resources. Instructions compete for execution resources within their sharing groups. When an instruction sends information to an execution unit for processing, this is termed instruction issue. Unlike conventional machines, an instruction can be issued to execution or function units many times during the time that the instruction is in the instruction window. This will be discussed in more detail later.

Instructions compete for memory bandwidth with all of the other active stations in the other instruction window columns located in the same row. This is illustrated with the contention for the horizontal row buses to the memory interface buffers shown in FIG. 6. Active stations also compete to store their output register results into a row's architected register file copy with all other active stations in the same sharing group.

Speculative reads to main memory are allowed at any time during an instruction's execution but memory writes are only allowed, in the current implementation, at instruction retirement time. When the instructions in the left-most column of the instruction window, those with the smallest time tags, have all completed executing, they are ready for retirement. Retirement may occur immediately, independently of instruction window loading.

Therefore, in general, instructions can be thought of as proceeding through fetch, decode, branch tracking, staging, load, issue, and retirement/write-back stages. We now give more detailed explanations of the functioning of the resource flow computer's components from the point-of-view of the active stations.

Active Station Operation on Data Values: As noted already, an instruction in an active station can be issued to an execution unit more than once. An instruction is issued to an execution unit when one of its inputs is changed but which has a time tag later than or equal to that of the last source value that was acquired by the instruction's input.

An active station snoops all forwarding buses originating from earlier sharing groups for changed input values. As discussed earlier, values from stations more than a forwarding span earlier go through one or more forwarding registers; logically, we look at the buses as being uniform and going all the way back to the earliest station in the window.

Values are forwarded on these buses with the address of the architected register that is being changed along with its value, and with information indicating its time tag (time order) within the instruction window. All forwarding buses are snooped by an active station for updates corresponding to those registers that are the station's inputs. The register address comparisons are done using the RIADDR registers and comparators associated with the two register sources and register destination of the active station.

Forwarded branch predicates (representing control flow dependencies) and forwarded output data values are snooped and processed somewhat differently. Considering data values first, the physical arrangement of the data forwarding buses originating from the sharing groups ensures that only values originating from previous instructions are considered as possible inputs. However, values coming from previous instructions that are earlier in time than a previously snarfed data value must be ignored. This is accomplished by using the time tag mask registers (TTMASK) in the active stations. Again, there is a time tag mask associated with all data oriented sources in the active station (including the relay source value for the instruction's output).

The time tag mask is actually physically two masks, one representing the last forwarding span of active stations (32 assumed for this discussion) and is termed the forwarding bus time tag mask. The other mask represents each of the previous forwarding spans (normally a column worth of active stations) and is termed the forwarding column time tag mask; the latter is appended to the former. The forwarding bus time tag mask in this example is 32 bits wide, one bit for each of the 32 active stations being snooped by the active station. The column mask in this implementation example is seven bits wide, each bit representing one of the previous seven forwarding spans (there are eight forwarding spans in the implementation being described). Both the forwarding bus time tag mask and the column time tag mask are ordered corresponding to the time order of the forwarding buses and previous columns respectively. As a convention, we assume that both masks are ordered such that the right-most bits corresponding both to active stations (in the case of the forwarding bus time tag mask) and to forwarding span columns (in the case of the column time tag mask) are from active stations earlier in time. Bits which are set in the masks represent forwarding buses or forwarding spans that are allowed to be snarfed by this active station. Bits which are cleared serve to prevent the snarfing of data.

If a source input is snarfed from the last forwarding span number of active stations (within the last 32 active stations in this implementation), then the position of the bus, as ordered corresponding to the time of the active station that is originating data on it, is compared with the forwarding bus time mask. If the corresponding bit in the time tag mask is clear, then no snarfing is performed. If the bit in the time tag mask is set, then the data value is snarfed and all bits to the right of the bit just examined (earlier in time) are cleared. The same sort of operation is done analogously with the column time tag mask when a forwarded value originated from an active station prior to the preceding forwarding span number of active stations. Within each forwarding span of active stations, a generated output value will never be forwarded beyond a forwarding span (32) if some instruction within the next 32 active stations also outputs a value to the same ISA register address. Since only one output data value per register address will ever be forwarded beyond a forwarding span of active stations, this technique of using a column mask and a forwarding bus mask ensures that only a value equal to or later in time than that indicated by the mask (but earlier than the time tag of the snarling active station) will ever be snarfed. Additionally, a data output is only snarfed if the actual value of the data has changed from the previously snarfed or held value. This latter comparison is done with the equivalence comparators shown in FIG. 9 located along with the RIDAT and ROIDAT registers.

Active Station Operation on Predicates: Predicates are snooped and snarfed in a similar manner as data values, but since predicates are chained with a hardware oriented linked-list scheme and every predicate address is unique to its generating station, there is no need for the time restriction scheme associated with snarfing of data values. Only the predicate addresses being snooped need be compared, just as register addresses were compared with the forwarded output data snooping.

Figure 7:
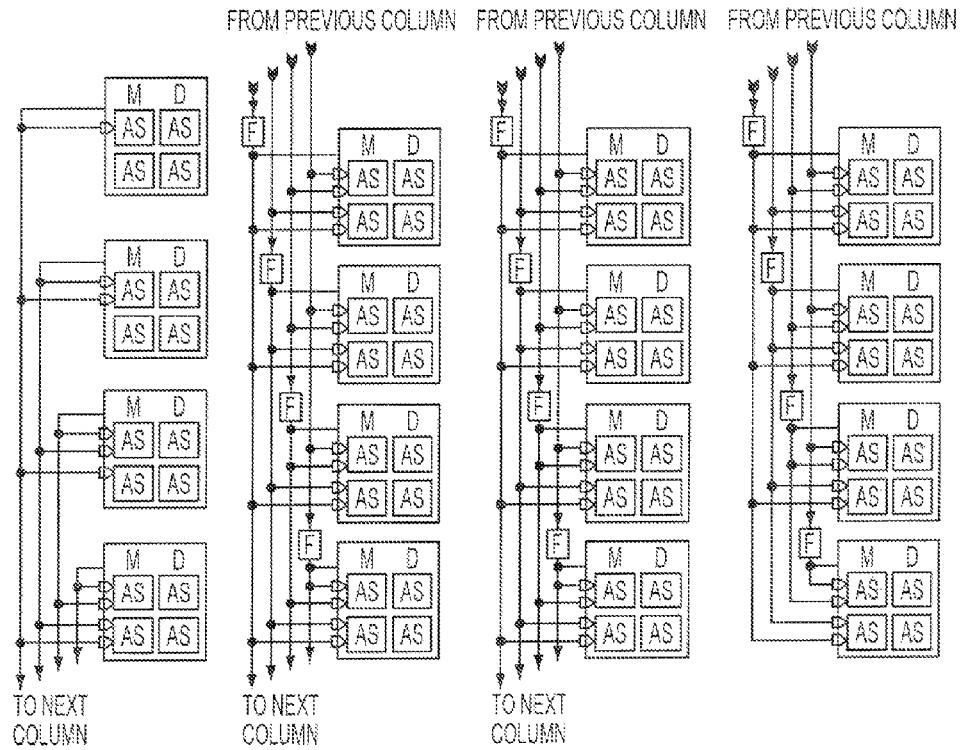
FIG. 7: Forwarding buses. For this example a sharing group size of 2 mL instructions is assumed, as before, along with an instruction window length of 32 instructions, folded to 8 rows by 4 columns. Forwarding spans are 8 instructions long. Blocks with 'f' in them are the forwarding registers. Note: this is the logical view. With column renaming, all physical columns look the same as the middle two columns here, with the buses from the last column wrapped around to the first column.

As previously mentioned, predicates use a separate forwarding bus structure from the data forwarding buses and their operation differs, but the block diagram is the same (see FIG. 7). However, the predicate buses are only one bit wide. There are two identical sets of buses, one for the regular predicates and one for the canceling predicates. As with data the predicate value and its address are broadcast on a bus by a sharing group. The predicate may go through multiple forwarding registers before being superseded. With predicates, any later predicate being broadcast, that is having any other predicate address, terminates the broadcast of all earlier predicates. This is due to the predicate chaining being done with active stations.

It is possible that the ideal sharing group size for predicates may be different than that for data. This is allowable by the invention. The predicate system is basically independent of the data system, although it may be convenient to make their dimensions the same Note that predicate register addresses are actually the time tags of instructions generating the specific predicate. For this reason, there must exist arithmetic decrementing logic to subtract one from the column address part of the time tag when a logic left-shift operation occurs on the instruction window.

As with register values and data dependencies, predicates are chained to logically form control dependency trees corresponding to those in the program being executed. Just as when a new updated value of a data source becomes available for an instruction, causing it to become enabled to execute again, so too can a changed predicate value cause an instruction to enable another execution. A predicate value for an instruction can change when a previous branch, on which the instruction is control dependent, either becomes resolved mispredicated or changes its prediction for some reason.

If a predicate value is broadcast but its value does not change, any instructions depending on that predicate rebroadcast their output values. This requirement handles the situation where a branch prediction was changed causing a replacement of a segment of the ML path with a corresponding DEE path. In this case, the output values of those instructions beyond the branch having the changed prediction have to be rebroadcast. This is because the DEE output values are usually different than the output values that were last broadcast from the former ML path of active stations. Techniques to selectively avoid this later re-broadcasting of output values are being considered. However, this would be to tune the machine's performance; the present scheme has the necessary functionality and does not affect the operation of other parts of the machine.

In those cases where an instruction is simultaneously the target of two or more branches, extra active stations can be allocated for the instruction at instruction load time in order to utilize the extra canceling predicate register hardware in the active station. FIG. 9 illustrates only one set of canceling predicate hardware but an implementation may contain more than one set of this hardware as an optimization. One set of canceling predicate hardware is required for each branch that an instruction may be the target for. In cases where an instruction is the target of more than one branch and where there are not enough canceling predicate hardware sets in the active station to accommodate the number, the canceling predicate hardware sets of the following active station is also used to detect when a predicate changes. In any event, an instruction is enabled for re-execution when any of its input predicates or canceling predicates change or are just rebroadcast.

Operation Summary: Instructions can be speculatively executed far ahead of the committed execution state while still being able to eventually re-execute as necessary in order to eventually correspond to the final committed state. We have created mechanisms that manage both the data dependencies and the control dependencies that trigger an instruction to re-execute when either an input predicted data value changes or an input predicated control condition changes. Using these techniques, instructions can be dispatched for execution according to a priority scheme that only has to consider the availability of resources in the machine. Hence, this new execution model has been termed resource flow execution.

Figures 10, 11, 12, 13:
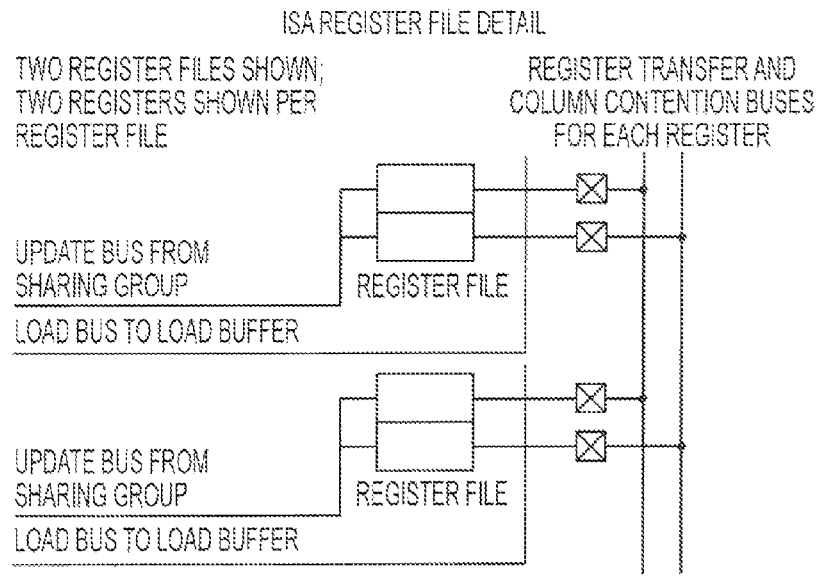
FIG. 10: ISA register file copy's interconnection. There is one bus per register (on the right). This complex is used to maintain coherency (same data) among all of the file copies.
FIG. 11: Timing of the code example, data scenario 1. In this example all of the instructions are able to execute in the first cycle. Execution of an instruction at a given time is indicated by an 'X'.
FIG. 12: Timing of the code example, data scenario 2. In this example instructions 20 and 30 are not able to execute immediately. Execution of an instruction at a given time is indicated by an 'X', as before.
FIG. 13: Timing of the code example, data scenario 3. In this example instruction 10 does not re-execute due to an update of its input register from instructions 10 and 20 but does finally reexecute after an update from instruction 00. Execution of an instruction at a given time is again indicated by an 'X'.

Register File Details: This section gives some expanded information on the operation of the architected ISA register file copies. FIG. 10 shows a more detailed view of two register files each holding just two registers, for illustration.

The ISA register files serve the purpose of maintaining the latest, or nearly the latest, versions of all architected registers. There is one register file implemented per row of active stations in the instruction window. Each register file contains a complete complement of all of the ISA registers.

As instructions are fetched, they are staged for loading into the instruction window using the load buffer. Nominally, when the instruction load buffer is full and the last (left-most) column of the instruction window is ready to be retired, a shift-left load operation occurs. All register sources for the loaded instructions must come from the ISA registers. Remember also that the initial value for an output relay register in assignment instructions must also be loaded. The source registers are all broadside loaded using a wide bus coming from the outputs of each row's register file since all active stations in a row will be loaded simultaneously in one cycle.

Another important requirement for the register files is to maintain the latest versions of the data in all of the ISA registers. The latest versions of the registers will be those outputs produced by those executing or relaying active stations with the highest numbered time tags. Instructions being staged for future loading are properly viewed as being later in time than the last column (right-most) loaded and therefore need to get the values that have been produced the latest but, just prior to them. As a heuristic the loading instructions get the latest values produced, which may or may not be in the last column. Further, since there are many copies of the register files, some means must be provided to keep all copies consistent.

As register outputs are produced by active stations, in addition to the values being broadcast to other active stations on the forwarding buses, the register values must also be broadcast to the ISA registers. Each sharing group of active stations share an update bus to the register file for one row. Since data results are primarily produced by the PE's, there is usually only one result being generated at most, each cycle from a sharing group. Therefore, there is little if any contention for the update bus. Contention for the update bus in any single clock cycle will result in only one update being done in the cycle, the other updates waiting one or more cycles and part of the hardware stalling (probably the PE's broadcast) until the contention ends.

When an update on a row is being considered to be loaded into its associated register in the row's register file, the column part of the time tag of the update is compared with that stored in the register in the file (from previous loads) and the file register is only updated if the broadcast value is later in time than the currently stored value.

Now we have to address the issue of updating all register files with the latest value. If an update does write into a row's register file, the column part of its one-hot time tag mask is put onto the register contention bus for that register. Note that each register in the register files has an associated column contention bus interconnecting all register files as well as a register value transfer bus. The register contention bus is a one-hot wired-logic bus used to evaluate which row has the latest register value. When column parts of the time tags on registers do not match, the latest column is always used. For matching columns, the later numbered row is always the latest. Once the latest register value is determined (which row it is in), it is broadcast on the register transfer bus so that all other earlier register files can snarf it.

The instruction window load operation is slightly more complicated by the register update and coherency mechanism. It is possible in most implementations that a register update coming from an active station to the register files may be in progress simultaneously with an instruction window load operation. In this case, an active station may be loaded with a less-than latest register value. Additional logic is included in each register file to track the last loaded values and to re-broadcast a new register value to the recently loaded active stations that may have loaded an earlier value. The implementation of this mechanism may require the addition of a time tag comparison in the right-most column of active stations in order to insure that only a later valued register is accepted by an active station.

There are a number of other possible ISA register file implementations, but we have illustrated one that minimally meets the requirements both for storing the ISA register values and for providing initial source values for loaded instructions.

B.6 Examples of Operation

Some simple examples of code execution in the resource flow machine will be given in this section in order to illustrate the snooping/snarfing operation across active stations. We first give examples illustrating the data transmittal features of the invention. Examples incorporating predication follow that section.

DATA EXAMPLES

A snippet of code that we will consider for the first two examples follows. We will assume that each of the instructions are loaded into active stations with the same row designation as the instruction number. We also assume that each instruction is in a different sharing group so the instructions do not compete with each other for a PE.

00 r9<-r0 op r1
10 r3<-r5 op r6
20 r3<-r7 op r8
30 r2<-r3 op r8

Data Example 1

In the first example we will look at how instruction number 30 gets the correct value for one, of its sources, namely register r3. Refer to FIG. 11 for an illustration of the execution timing.

Instruction number 00 does not produce any outputs used in the next few instructions that we will consider so there is no data dependency and its output is never snarfed by the later instructions. Therefore, the execution of instruction 00 therefore does not further impact the correct operation of instruction 30.

At load time, instruction 30 will load register r3 from the ISA register file as an initial value guess. This may not be the correct value that instruction 30 should be using but we use it anyway as a predicted value. In this example, instructions numbered 10 and 20 both generate an output to register r3. Instruction 30 will snoop the buses looking for a broadcast of r3, and will only snarf it if the broadcast value differs from the current value of r3 held in instruction 30's active station. That station will watch for the address of that register (the number 3 in this example) to appear on one of the four data output forwarding buses the station is connected to (following FIG. 7).

The instructions may all execute immediately after they are loaded, assuming their corresponding PE is free. Let's assume that this happens and all instructions execute in the same clock immediately upon being loaded. Instruction 30 will now have a result based on what register r3 was at load time but a new output for this register has just been produced by both instructions 10 and 20. Instructions 10 and 20 will both broadcast forward their new output values for r3 on separate forwarding buses; instruction 30 is snooping for a new update to register r.3 on both of these buses (and the others).

Updates coming from both instructions 10 and 20 will be considered for snarfing by instruction 30 since its forwarding bus time tag mask initially has all bits set. Instruction 30 will see that the output from instruction 20 is later in time than that from instruction 10, so it will snarf instruction 20's value and update its forwarding bus time tag mask by clearing all bits to the right (earlier in time) than the bit corresponding to instruction 20 above. No register updates from instruction 10 will ever again be snarfed by instruction 30. New updates from instruction 20 will still be considered though since its bit in the forwarding bus time tag mask is still set.

Data Example 2

Another Example, still referencing the code snippet above in Data Example 1, is that upon the instructions all being loaded in the same clock period, only instructions 00 and 10 can execute immediately. (Instructions 20 and 30 may not be able to execute due to other instructions, not shown, having priority for execution resources.) Again, we focus on what instruction 30 does to get a correct value for register r3. See FIG. 12 for the code execution timing.

After being executed, instruction 10 will broadcast its updated value for register r3 on a forwarding bus. This value will be snarfed by instruction 30 since all of its time tag mask bits are still set. Upon snarfing the updated value from instruction 10, all time tag bits to the right of it will be cleared to zero. In our current example, there were no instructions earlier than instruction 10 within the instruction window which generated an output to register r3 but the bits are cleared just the same.

Instruction 30 will now execute using the updated register value. Also, if it had already executed, the act of snarfing a value will enable the instruction to execute again. Of course, the newly broadcast value would not have been snarfed if its value did not change, nor would instruction 30 have executed.

Finally, instruction 20 gets a chance to execute and afterwards it broadcasts its output value on a forwarding broadcast bus, as always. Since instruction 20 is later in time than instruction 10, the bit in the time tag mask of instruction 30 which corresponds to instruction 20 will still be set indicating that a snarf is still possible from that instruction.

Note that if instruction 20 had executed before instruction 10, instruction 30 would have cleared the enabling time tag bit corresponding to instruction 10, so that once instruction 10 did execute, its value would be ignored by instruction 30. This is exactly what is desired: an instruction should use the input value from the closest but earlier instruction for the final value of the input.

From a performance point of view, the above examples illustrate that an instruction will execute as soon as it possibly can. Further, if the data value prediction was correct, or the instruction's inputs do not change even if they have been re-evaluated, then the instruction need not execute or reexecute, respectively. Therefore the performance of this invention is potentially much greater than competing techniques.

Data Example 3

Now consider the simple code excerpt below, with the execution timing as shown in FIG. 13.
00 r3<-r5 op r6
10 r1<-r3 op r1
20 r3<-r5 op r6

In this example we assume that instructions 10 and 20 get to execute before instruction 00 does. We will also assume that instructions 10 and 20 both execute in the same clock cycle. Initially, as always, the sources for these instructions are taken from the ISA register file at load time.

Firstly, it should be noted that after instruction 10 executes at least once, it will not necessarily be enabled to execute again even though one of its input sources has changed, namely register r1. It is not enabled to execute again for this input source change because the new value of r1 that is generated is only forwarded to instructions later in time order than instruction 10. Instruction 10 will never, therefore, see register r1 being updated due to its own broadcast of that register.

In like manner, instruction 10 will not be enabled to execute simply because of the register change of r3 from instruction 20. This is because the output from instruction 20 will only be broadcast forward to later active stations.

Finally, when instruction 00 does get to execute, it will forward broadcast an updated value for register r3. Since instruction 10 is snooping on changes to this value, it will be enabled to execute again and will eventually do so.

Data Example 4

Finally with regard to data dependencies alone, we consider the following code excerpt.
00 r2<-r0 op r1
10 r3<-r2 op r0
20 r2<-r0 op r4
30 r5<-r2 op r4

The time order of the code's execution is shown in FIG. 14.

In this example we will put together some of the code execution and data dependency rules already illustrated separately. We assume that after all of the above instructions are loaded that instruction 10 gets to execute first. Next, instructions 00 and 30 get to execute together in a single clock. Instruction 00 then broadcasts an update for register r2. This enables or re-enables instructions 10 and 30 to execute again. They do so in the next clock cycle. Next, instruction 20 finally gets a chance to execute. Again an update for register r2 is broadcast forward. This enables instruction 30 to execute again but not instruction 10. Finally, instruction 00 executes again for some reason. Again, an update for register r2 is broadcast forward. However, this update does not enable instruction 30 to execute again since it had previously used a value from instruction 20. At the same time, this broadcast enables instruction 10 to execute again and it does so in the following clock cycle.

Data Example 5

Finally, this last data dependency example shows the penalty incurred due to the finite forwarding span in an implementation. We will assume a forwarding span of 32 for this example. Consider the following code excerpt. Note carefully the distance that each instruction is from each other. This distance will interact with the finite forwarding span to create extra bubbles in the execution of instructions even though there may be no other constraint preventing execution from occurring earlier.
000 r2<-r1 op r0
040 r3<-r2 op r0
080 r4<-r2 op r0
120 r5<-r3 op r0

The execution sequencing of this example is shown in FIG. 15.

All instructions are loaded and we assume that all instructions execute immediately and complete in one clock cycle. Further, we assume that any of these instructions are free from execution resource constraints and may execute in any clock cycle. The output generated from instruction 000 to register r2 will be broadcast on a forwarding bus and its value will be snarfed by instructions 040 and 080. Since there is no instruction between instruction, 000 and instruction 040 that uses register r2 as an input, that output forwarding broadcast operation will result in the output broadcast being registered in the forwarding register located at the end of its initial forwarding span. This is logically between active station 31 (part of sharing group 3) and active station 32 (part of sharing group 4). (Both stations and groups are numbered starting at 0). We assume eight stations per sharing group. The output of the forwarding register will then be broadcast on the next forwarding span but has incurred a clock cycle delay. This delay prevents instruction 040 from re-executing immediately in cycle 1, due to the forwarding broadcast, and instead can only execute again in clock cycle 2 at the earliest. The output broadcast from instruction 000 will again be registered in the forwarding register located at the end of the second forwarding span (logically after the end of active station 63 in sharing group 7). This further causes instruction 080, which was also snooping for updates to register r2, to become, enabled to re-execute. We assume that it does so at the earliest possible time which would be in clock cycle 3. Finally, instruction 120 was snooping for updates to register r3. An update to that register occurred in clock cycle 2 but because instruction 120 is more than a forwarding span away from instruction 080, a forwarding register delay is again incurred before the update is seen by instruction 120. Finally, instruction 120 can execute again at the earliest in clock cycle 4.

PREDICATION EXAMPLES

Now some examples involving control dependencies are examined.

Predication Example 1

Consider the following code sequence.
00 r2<-r1 op r0
10 b_op r2, 030
20 r3<-r1 op r0
30 r4<-r1 op r0

This example illustrates a simple minimal control dependency situation. Instruction 30 does not depend, either through a data flow dependency or a control flow dependency on any of the instructions that are shown to be before it. The branch instruction 10 is data dependent on instruction 00 (through register r2). Instruction 20 is control dependent on instruction 10 (the branch). The branch is initially predicted to be not-taken. The execution sequence of this example is shown in FIG. 16.

We start by assuming that all instructions execute in a single clock cycle and that they all execute immediately upon being loaded. It is assumed that the initial execution of the branch in instruction 10 (at time 0) did not change its predicate output. However, since instruction 00 executed in clock cycle 0, we will assume that its output value changed from what was originally loaded at instruction load time. Instruction 00 will broadcast its new updated output (register r2). Since instruction 10 (the branch) is data dependent on register r2 from instruction 00, it will snoop for that update and snarf the new value from the broadcast. This will enable it to re-execute. We assume that it executes at the earliest possible time. This would be clock cycle 1. On this execution, its output predicate, essentially its branch prediction, does change. The branch may either have been resolved at this point or simply have made a new prediction based on a possibly still speculative value of register r2. Either case is handled the same. A change in the branch condition will change its predication output and this will be broadcast out. If the branch became resolved and a DEE path originating due to this branch had been started, an implementation may abandon the current main-line execution path and switch the DEE path of this branch to become the new main-line path. For this example, we will assume that no switch to a DEE paths occurs. Therefore instruction 20, being control dependent on the branch, will be snooping for the branch predicate change and seeing that it has changed will switch to relaying its output value. The relay operation, takes the value for register r3 that was loaded, or snarfed, from before the execution of instruction 20, and re-broadcasts it. The re-broadcast of the relayed output value is necessary in those cases where following instructions used the previously broadcasted output value. The relaying operation would have also occurred if a DEE path became the new main-line path. Implementations can choose to switch executions paths or not under different conditions as optimization decisions.

In spite of the branch being predicted one way and then changed to the other (whether re-predicted or resolved), it should be noted that instruction 30 was not required to be re-executed as a result. This illustrates a basic minimal control dependency situation. In this case more instruction level parallelism (ILP) is realized by taking advantage of independent instructions located beyond the joins of branch domains.

Predication Example 2

Consider the following slightly more involved example than the first.
00 r2<-r0 op r1
10 b_op r2, 030
20 r2<-r3 op r0
30 r4<-r2 op r0

The time ordered execution sequence for this example is shown in FIG. 17.

It is assumed that all instructions are loaded and that the branch at 10 is initially predicted as not taken. Since instruction 20 is not restricted from executing due to the initial branch prediction of instruction 10, it can execute immediately upon being loaded. It is assumed that it does execute immediately and before all other instructions shown. Since instruction 30 is data dependent on instruction 20 it snarfs up the newly created value for register r2 from instruction 20 and is enabled to execute. Instruction 30 gets to execute in the following clock cycle. Instruction 00 executes in the next cycle creating a new value for register r2. We assume that this is still a speculative value. Note that since instruction 30 has already snarfed a value for register r2 later in time than that created by instruction 00, it is not enabled for execution due to this change. Instruction 10, however, is data dependent on instruction 00 (through r2) and is enabled to execute. Note carefully, also that instruction 20 was snooping for both its inputs and its output (register r2). It had to snoop for newly created values for r2 in case it was determined that the execution of the instruction was squashed. The new value of register r2 will be snarfed by instruction 20 from the output broadcast of instruction 00.

Instruction 10, the branch now executes. We assume that after the branch at 10 executes its output predicate changes, that is, the branch is now predicted to be taken. Its output predicate is broadcast and instruction 20, snooping on the branch output predicate, sees the broadcast and snarfs it. Instruction 20 now has an indication that its assignment of its executed value is no longer valid and instead broadcasts its relayed value for register r2. Finally, this newly broadcast value for register r2 will be snarfed by instruction 30 enabling it to re-execute also. Finally instruction 30 executes in clock cycle 5 as shown in the figure above.

This example showed how the effects of instructions within the domain of a branch are squashed when the branch is mispredicated. It also showed how the incorrect results of instructions beyond the join of a branch are corrected when a branch outcome is changed.

Predication Example 3

This next example illustrates a switch of a DEE path to become the new main-line path. Consider the following code sequence.
00 r2<-r0 op r1
10 b_op r2, 030
20 r3<-r0 op r1
30 r4<-r0 op r1

The time ordered execution sequence for this example is shown in FIG. 18.

It is assumed that all instructions are loaded and that the branch at 10 is initially predicted as taken. It is also assumed that all of the instructions are executed immediately in main-line active stations. Note that the execution of instruction 20 is really only just a relay operation because it is within the domain of the branch in instruction 10 and the initial prediction is taken. Because instruction 10 is data dependent on instruction 00, it sees the newly broadcasted value for register r2 from instruction 00 and becomes enabled to execute again, and does so in cycle 1.

It is now assumed that a DEE path was created some time after the initial executions already mentioned, and that instruction 20 gets to execute in the DEE path. Since the DEE path branch output predicate is always opposite of that of the same branch in the main-line active station, instruction 20 executes creating a new value for register r3 rather than relaying an old value as was done with this same instruction in the main-line path; the execution of instruction 20 in the DEE path is indicated with a 'D'. This newly created value for register r3 is broadcast and may be snarfed by later DEE path active stations. In this example, we have not shown any future instructions dependent on the output of instruction 20 but there could be some instructions executing in the instruction stream after instruction 30 as shown.

Finally, later on, instruction 00 re-executes, creating what will become the resolved committed state for register r2. This enabled the re-execution of instruction 10, the branch. When the branch executes, it also finally resolves. We will assume that the branch resolves to the not-taken state. This is opposite to its previous prediction, indicating a misprediction, and this will cause a switch of the DEE path to become the new main-line path. The effect of the DEE path switch to the main-line path causes all predicated DEE path instructions following the branch to re-broadcast their output values. This is seen happening with the broadcast-only

What is claimed is:

1. In a processing system, a method of executing program instructions comprising:
   loading a plurality of instructions into an execution window, a respective instruction having one or more instruction inputs and producing an instruction output upon execution thereof;
   concurrently executing instructions in at least a subset of said instructions, the subset containing at least one branching operation, that are loaded in said execution window irrespective of data dependencies and control dependencies corresponding to one or more branch predicates among said subset of instructions, to produce a plurality of first instruction outputs;
   broadcasting at least a subset of said first instruction outputs to instruction inputs of at least some of said instructions in said execution window; and
   selectively re-executing said instructions in said subset of instructions if their respective instruction inputs have changed as a result of said broadcasting.

2. The method of claim 1, wherein said subset of instructions includes data instructions which produce data instruction outputs from data instruction inputs upon execution.

3. The method of claim 1, wherein said subset of instructions includes predicate instructions which produce predicate instruction outputs from predicate instruction inputs upon execution.

4. The method of claim 1, further comprising re-executing an instruction more than once.

5. The method of claim 1, further comprising:
   predicting a value of at least one branch predicate to thereby predict an associated outcome of a branching operation.

6. In a processing system, a method of executing program instructions comprising:
   concurrently executing instructions in a plurality of first program instructions, the instructions containing at least one branching operation, without enforcing data dependencies and control dependencies corresponding to one or more branch predicates among said first instructions, to produce a plurality of first instruction outputs, wherein some of said first instruction outputs are instruction inputs to some of said first program instructions;
   detecting a change in one or more instruction inputs of said first program instructions as a result of production of said first instruction outputs; and
   selectively re-executing those of said first program instructions whose instruction inputs have changed.

7. The method of claim 6, wherein one or more instruction outputs serve as an instruction input to a respective one of said first program instructions, wherein said respective one of said first program instructions is re-executed if a sequence order of execution of one of said instruction outputs is earlier in time than a sequence order of execution of said respective one of said first program instructions and is the closest in time to said respective one of said first program instructions than others of said instruction outputs.

8. The method of claim 6, further comprising storing said first program instructions in a memory, wherein a sequence order of execution of said first program instructions is determined according to an order in which said first program instructions are stored in said memory.

9. The method of claim 6, further comprising:
   predicting a value of at least one branch predicate to thereby predict an associated outcome of a branching operation.

10. A scalable processing system having general purpose registers and a general purpose memory, comprising:
    a memory device that is operative to store a plurality of executable program instructions in definable locations, wherein the memory device is further operative to propagate respective ones of said executable program instructions through said memory device, wherein said executable program instructions include at least one branching operation;
    a plurality of processing elements distributed throughout said memory device, respective ones of said processing elements being configured and arranged to receive executable program instructions from current positions of said memory device, wherein said processing elements are configured to execute said executable program instructions associated with said current positions irrespective of data dependencies and control dependencies corresponding to one or more branch predicates among said executable program instructions, and are configured to produce program instruction outputs; and
    broadcast logic operative to broadcast said program instruction outputs as program instruction inputs to at least some of said executable program instructions, wherein the plurality of processing elements are configured to selectively re-execute said executable program instructions if their respective program instruction inputs have changed based on said program instructions outputs.

11. The system of claim 10, wherein said executable program instructions includes data instructions which produce data instruction outputs from data instruction inputs upon execution.

12. The system of claim 10, wherein said executable program instructions includes predicate instructions which produce predicate instruction outputs from predicate instruction inputs upon execution.

13. The system of claim 10, wherein the plurality of processing elements are further configured to selectively execute an executable program instruction more than once.

14. A processing system comprising:
    means for loading a plurality of instructions into an execution window, a respective instruction having one or more instruction inputs and producing an instruction output upon execution thereof, wherein said instructions include at least one branching operation;
    means for concurrently executing instructions in at least a subset of said instructions that are loaded in said execution window irrespective of data dependencies and control dependencies corresponding to one or more branch predicates among said subset of instructions, to produce a plurality of first instruction outputs;
    means for broadcasting at least a subset of said first instruction outputs to instruction inputs of at least some of said instructions in said instruction window; and
    means for selectively re-executing said instructions in said subset of instructions if their respective instruction inputs have changed as a result of said broadcasting.

15. The system of claim 14, wherein said subset of instructions includes data instructions which produce data instruction outputs from data instruction inputs upon execution.

16. The system of claim 14, wherein said subset of instructions includes predicate instructions which produce predicate instruction outputs from predicate instruction inputs upon execution.

17. The system of claim 14, further comprising means for re-executing an instruction more than once.

18. A processing system comprising:
means for concurrently executing instructions in a plurality of first program instructions without enforcing data dependencies and control dependencies corresponding to one or more branch predicates among said first program instructions, to produce a plurality of first instruction outputs, wherein some of said first instruction outputs are instruction inputs to some of said first program instructions, and wherein said first program instructions include at least one branching operation;
means for detecting a change in one or more instruction inputs of said first program instructions as a result of production of said first instruction outputs; and
means for selectively re-executing those of said first program instructions whose instruction inputs have changed.

19. The system of claim 18, wherein one or more instruction outputs serve as an instruction input to one of said first program instructions, wherein said means for selectively re-executing is configured to re-execute a respective one of the first program instructions if a sequence order of execution of one of said instruction outputs is earlier in time than a sequence order of execution of said respective one of said first program instructions and is the closest in time to said respective one of said first program instructions than others of said instruction outputs.

20. The system of claim 18, further comprising means for storing said first program instructions, wherein a sequence order of execution of said first program instructions is determined according to an order in which said first program instructions are stored in said means for storing.

* * * * *

UNITED STATES PATENT AND TRADEMARK OFFICE
CERTIFICATE OF CORRECTION

PATENT NO. : 7,991,980 B2
APPLICATION NO. : 12/254684
DATED : August 2, 2011
INVENTOR(S) : Uht et al.

It is certified that error appears in the above-identified patent and that said Letters Patent is hereby corrected as shown below:

Title Page 2, item (56), under "Other Publications", in Column 1, Line 6, delete ""Hiefarchical" and insert -- "Hierarchical --.

Title Page 2, item (56), under "Other Publications", in Column 1, Line 11, delete ""THe" and insert -- "The --.

Title Page 2, item (56), under "Other Publications", in Column 1, Line 18, delete "Peiformance" and insert -- Performance --.

Title Page 2, item (56), under "Other Publications", in Column 1, Line 41, delete "Micmarchitecture" and insert -- Microarchitecture --.

Title Page 2, item (56), under "Other Publications", in Column 1, Line 62, delete "Syposium" and insert -- Symposium --.

Title Page 2, item (56), under "Other Publications", in Column 2, Line 8, delete "Millenium,"" and insert -- Millennium," --.

Title Page 2, item (56), under "Other Publications", in Column 2, Line 25, delete "Pelformance" and insert -- Performance --.

Title Page 2, item (56), under "Other Publications", in Column 2, Line 49, delete "i Proceedings" and insert -- in Proceedings --.

Title Page 2, item (56), under "Other Publications", in Column 2, Lines 50-51, delete "Architecture.Gold" and insert -- Architecture, Gold --.

Title Page 3, item (56), under "Other Publications", in Column 1, Line 3, delete "Suport" and insert --Support --.

Signed and Sealed this
Tenth Day of January, 2012

David J. Kappos
*Director of the United States Patent and Trademark Office*

CERTIFICATE OF CORRECTION (continued)

U.S. Pat. No. 7,991,980 B2

Title Page 3, item (56), under "Other Publications", in Column 1, Line 35, delete "10pages" and insert -- 10 pages --.

Title Page 3, item (56), under "Other Publications", in Column 1, Line 50, delete "USing" and insert -- Using --.

Title Page 3, item (56), under "Other Publications", in Column 1, Line 71, delete "pagestotal." and insert -- pages total. --.

Title Page 3, item (56), under "Other Publications", in Column 2, Line 60, delete "Paderbom," and insert -- Paderborn, --.

Title Page 3, item (56), under "Other Publications", in Column 2, Line 66, delete "IEEEComputer" and insert -- IEEE Computer --.

Title Page 4, item (56), under "Other Publications", in Column 2, Line 2, delete "atfhe" and insert -- at the --.

Title Page 4, item (56), under "Other Publications", in Column 2, Line 9, delete "condsiderations" and insert -- considerations --.

Title Page 4, item (56), under "Other Publications", in Column 2, Line 10, delete "Proceeedings" and insert -- Proceedings --.

Title Page 4, item (56), under "Other Publications", in Column 2, Line 11, delete "Suport" and insert -- Support --.

Column 1, line 7-8, delete "application. No." and insert -- application no. --.

UNITED STATES PATENT AND TRADEMARK OFFICE
CERTIFICATE OF CORRECTION

PATENT NO.          : 7,991,980 B2
APPLICATION NO.     : 12/254684
DATED               : August 2, 2011
INVENTOR(S)         : Augustus K. Uht et al.

It is certified that error appears in the above-identified patent and that said Letters Patent is hereby corrected as shown below:

In the Specification:

Column 1, line 14, please insert the following:

--GOVERNMENT LICENSE

This invention was made with government support under Grant Nos. MIP-9780183, EIA-9729839, and DUE-9751215, awarded by the National Science Foundation. The government has certain rights in this invention.--

Signed and Sealed this
Twelfth Day of July, 2016

Michelle K. Lee
*Director of the United States Patent and Trademark Office*